(12) United States Patent
Miller et al.

(10) Patent No.: US 11,227,728 B2
(45) Date of Patent: Jan. 18, 2022

(54) TRANSFER SWITCH CONTACTOR MECHANISM

(71) Applicant: Generac Power Systems, Inc., Waukesha, WI (US)

(72) Inventors: Debra J. Miller, Grafton, WI (US); Joseph Peter Gerovac, Menomonee Falls, WI (US); Joseph M. Finney, Milwaukee, WI (US); Nicholas P. Brusky, Milwaukee, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 0 days.

(21) Appl. No.: 17/168,331

(22) Filed: Feb. 5, 2021

(65) Prior Publication Data

US 2021/0280376 A1    Sep. 9, 2021

Related U.S. Application Data

(60) Provisional application No. 62/970,593, filed on Feb. 5, 2020.

(51) Int. Cl.
| | | |
|---|---|---|
| *H01H 3/38* | (2006.01) | |
| *H02J 9/06* | (2006.01) | |
| *H01H 3/26* | (2006.01) | |
| *H01H 3/40* | (2006.01) | |

(52) U.S. Cl.
CPC ............... *H01H 3/26* (2013.01); *H01H 3/38* (2013.01); *H01H 3/40* (2013.01); *H01H 2300/018* (2013.01); *H02J 9/062* (2013.01)

(58) Field of Classification Search
CPC .. H01H 3/26; H01H 3/40; H01H 3/38; H01H 2300/018
See application file for complete search history.

(56) References Cited

U.S. PATENT DOCUMENTS

| | | |
|---|---|---|
| 6,765,157 B2 | 7/2004 | Rademacher et al. |
| 7,435,920 B1 | 10/2008 | Yoo |
| 10,079,505 B2 | 9/2018 | Zhou et al. |
| 2016/0307711 A1 | 10/2016 | Wang et al. |
| 2019/0103241 A1 | 4/2019 | Gibson |

OTHER PUBLICATIONS

PCT International Searching Authority; International Search Report and Written Opinion for International application No. PCT/US21/16793 dated Apr. 26, 2021; 15 pages.

*Primary Examiner* — Vanessa Girardi
(74) *Attorney, Agent, or Firm* — Merchant & Gould P.C.

(57) ABSTRACT

An automatic transfer switch includes a motor and a drive shaft rotatable by the motor. The automatic transfer switch includes a gear rotatable by the drive shaft. The automatic transfer switch includes a pin attached to, and movable with, the gear. The pin is offset from the central axis of the gear. The automatic transfer switch includes a bracket rotatable around the central axis of the gear and connected to an output shaft. The bracket is rotatable separately from the gear. Upon rotation of the bracket, the output shaft rotates. The bracket has at least a first source position and a second source position and the first and second source positions are different. The automatic transfer switch includes a module connected to the output shaft. The module includes at least one movable electrical contact which moves upon rotation of the output shaft.

24 Claims, 23 Drawing Sheets

TRANSFER SWITCH CONTACTOR MECHANISM

CROSS REFERENCE TO RELATED APPLICATION

This application claims the benefit of U.S. Provisional Application Ser. No. 62/970,593, filed Feb. 5, 2020, the disclosure of which is hereby incorporated by reference in its entirety.

BACKGROUND

An electrical load uses a transfer switch to switch between a primary electrical source, such as a utility, and a secondary electrical source, such as a generator. For example, if the power from a primary source is inadequate, such as during a power outage, the transfer switch can automatically switch to the secondary source so that the electrical load is not without adequate power. Switching between the two sources can be automatically or manually operated.

Traditional transfer switches have used a manually actuated device and, to achieve automatic operation, powered the movement of the transfer switch. During switching, if not done at the proper speed and force, current arcing can damage the contacts used for the primary and secondary power sources. When there is contact arcing at high current, the contacts can be severely damaged. Further, at high current, contacts can become welded together, and therefore a high torque is needed to break the contacts during switching.

Therefore, there is a need for automatic transfer switches that can achieve reliability at high currents.

SUMMARY

The present disclosure is directed to automatic transfer switches. In certain examples, aspects of the present disclosure relate specifically an automatic transfer switch having a contactor mechanism operable around a single central axis.

One aspect of the present disclosure relates to an automatic transfer switch. The automatic transfer switch includes a motor and a drive shaft rotatable by the motor. The automatic transfer switch includes a gear rotatable by the drive shaft. The gear has a plurality of teeth offset from a central axis of the gear and the teeth are engageable by the drive shaft. The automatic transfer switch includes a pin attached to, and movable with, the gear. The pin is offset from the central axis of the gear. The automatic transfer switch includes a bracket rotatable around the central axis of the gear and connected to an output shaft. The bracket is rotatable separately from the gear. Upon rotation of the bracket, the output shaft rotates. The bracket has at least a first source position and a second source position and the first and second source positions are different. The automatic transfer switch includes a chargeable motivator that has a first end and a second end. The first end is connected to the pin and the second end is connected to a portion of the bracket offset from the central axis. The chargeable motivator is at least partially charged upon movement of the pin to motivate the movement of the bracket between the first and second source positions. The automatic transfer switch includes a module connected to the output shaft. The module includes at least one movable electrical contact and the at least one electrical contact moves upon rotation of the output shaft.

Another aspect of the present disclosure relates an electrical contactor mechanism for an automatic transfer switch. The electrical contactor mechanism includes first and second motors mounted within the housing. The electrical contactor mechanism includes a drive shaft rotatable simultaneously by the first and the second motors. The electrical contactor mechanism includes a first gear mounted within the housing and rotatable by the drive shaft, and the first gear has a plurality of teeth offset from a central axis of the first gear. The teeth are engageable by the drive shaft. The electrical contactor mechanism includes a second gear mounted within the housing and rotatable by the drive shaft. The second gear has a plurality of teeth offset from the central axis and the teeth are engageable by the drive shaft. The electrical contactor mechanism includes a pin attached to, and movable with, the first and second gears. The pin is offset from the central axis. The electrical contactor mechanism includes a bracket that is rotatable around the central axis and connected to an output shaft. The bracket is rotatable separately from the first and second gears. Upon rotation of the bracket, the output shaft rotates. The bracket has at least a first source position and a second source position and the first and second source positions are different. The electrical contactor mechanism includes a chargeable motivator that includes a pair of springs. The chargeable motivator has a first end and a second end. The first end is connected to the pin and the second end is connected to a portion of the bracket offset from the central axis. The springs of the chargeable motivator are at least partially stretched upon movement of the pin to urge the movement of the bracket between the first and second source positions.

One aspect of the present disclosure relates to an automatic transfer switch. The automatic transfer switch includes first and second motors and a drive shaft rotatable simultaneously by the first and the second motors. The automatic transfer switch includes a first gear rotatable by the drive shaft. The first gear has a plurality of teeth offset from a central axis of the first gear and the teeth are engageable by the drive shaft. The automatic transfer switch includes a second gear rotatable by the drive shaft. The second gear has a plurality of teeth offset from the central axis and the teeth are engageable by the drive shaft. The automatic transfer switch includes a pin attached to, and movable with, the first and second gears and the pin is offset from the central axis. The automatic transfer switch includes a bracket rotatable around the central axis and connected to an output shaft. The bracket is rotatable separately from the first and second gears, and, upon rotation of the bracket, the output shaft rotates. The bracket has at least a first source position and a second source position and the first and second source positions are different. The automatic transfer switch includes a chargeable motivator including a pair of springs. The chargeable motivator has a first end and a second end. The first end is connected to the pin and the second end is connected to a portion of the bracket offset from the central axis. The springs of the chargeable motivator are at least partially stretched upon movement of the pin to urge the movement of the bracket between the first and second source positions. The automatic transfer switch includes a module connected to the output shaft, and the module includes at least one movable electrical contact. The at least one electrical contact moves upon rotation of the output shaft.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
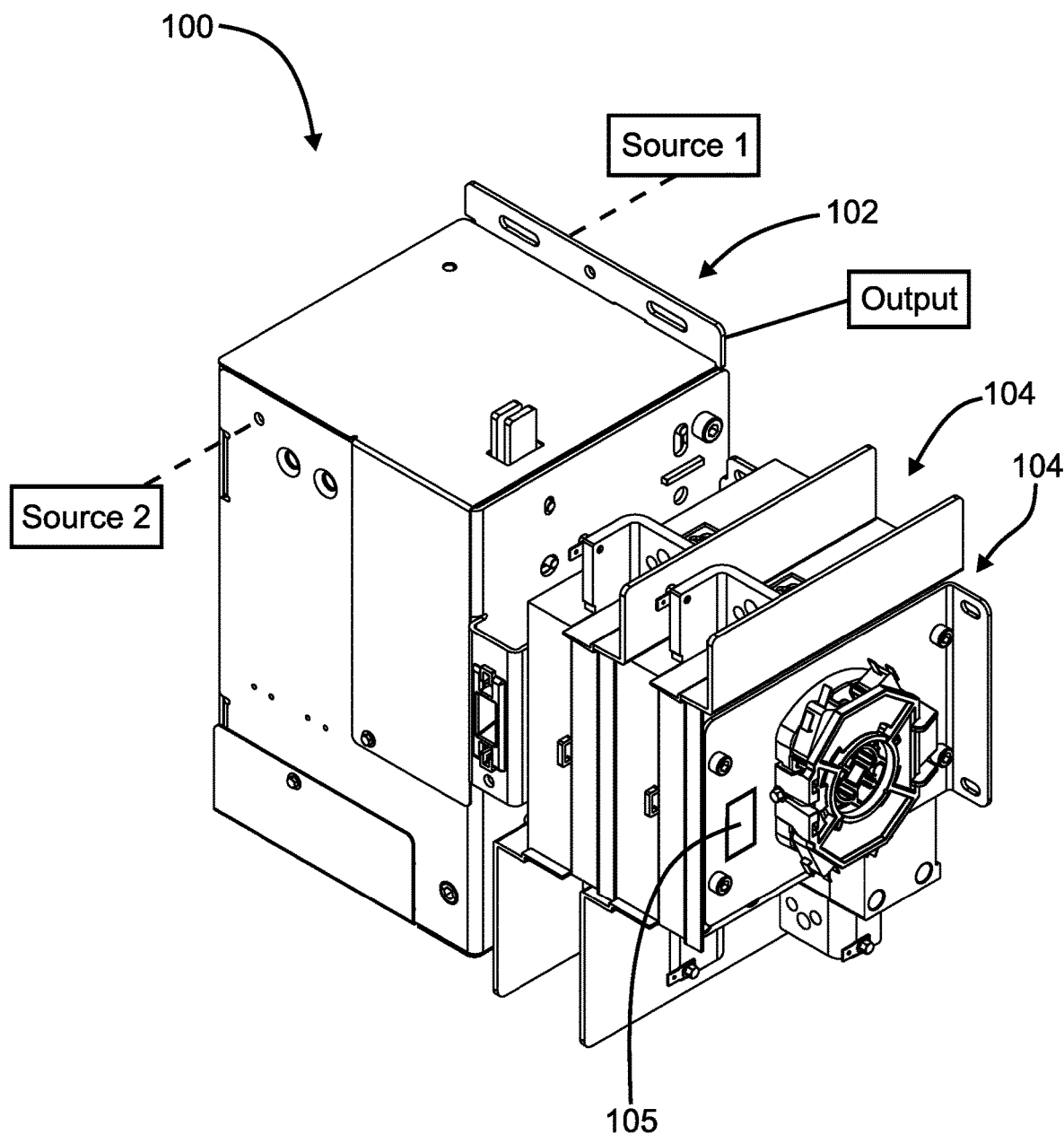
FIG. 1 is a schematic view of a transfer switch.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The disclosure relates to transfer switches, specifically an automatic transfer switch 100. The transfer switch 100 is configured to selectively connect an output, such as a building, with a first source or a second source. For example, the transfer switch 100 automatically chooses a source 2 (e.g., a generator source) when it senses a loss of power from a source 1 (a utility source). In some examples, the transfer switch 100 is configured to be operated in current environments ranging from 0-400 Amps with voltages ranging from 160 VAC to 312 VAC.

The transfer switch 100 includes a contactor mechanism 102 and a plurality of contact modules 104. The contactor mechanism 102, operated either manually or automatically, is configured to move contacts 105 located in each contact module 104 to selectively toggle between source 1 and source 2. In some examples, the knife contacts can be moved to an OFF position where no source is selected. In some examples, the contactor mechanism 102 is capable of driving between two and four contact modules 104 depending on the phase of the output.

The contactor mechanism 102 operates around a single central axis C, and, because it incorporates both electrical and mechanical interlocks, the contactor mechanism 102 requires a single switch to meet high fault currents. Specifically, the contactor mechanism 102 is capable of connecting the contacts within each contact module 104 at high speeds and forces while also using high torque to break the contacts to accommodate a range of currents. Further, the contactor mechanism 102 allows for fast transfer between two different power sources that are phase locked to allow in-phase power transfer.

Figure 2:
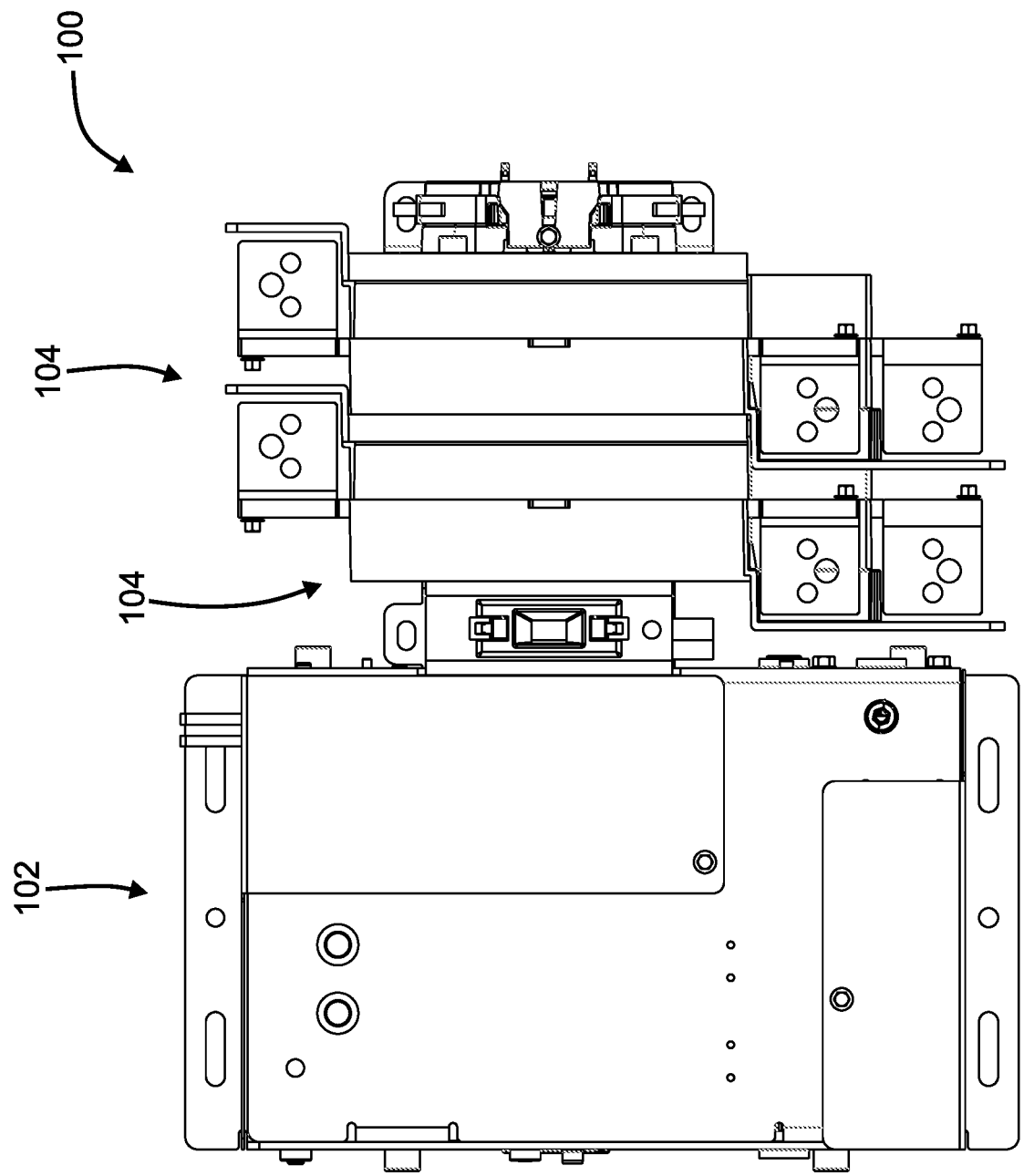
FIG. 2 is a side view of the transfer switch of FIG. 1.

FIG. 1 shows a perspective view of the transfer switch 100 including the contactor mechanism 102 and a plurality of contact modules 104. FIG. 2 shows a side view of the transfer switch 100. The transfer switch 100 is schematically connected to source 1, source 2, and the output. In some examples, source 1 is the utility source and source 2 is a back-up source, such as a generator. Typically, a gasoline, diesel, propane, or natural gas internal combustion engine-powered electrical generator, capable of generating split-phase alternating voltage, may be installed in or near a building, and arranged to be connected to one or more of the electrical circuits in the residence in order to provide the desired back-up power. In some examples, the transfer switch can be located in a cabinet and/or mounted in close proximity to the outputting system, (e.g., within a building).

The contactor mechanism 102 is configured to selectively connect the output with source 1 or source 2 by moving the contacts 105 located within each of the contact modules 104. Each contact module 104 includes a pair of contacts 105 that each correspond with source 1 and source 2. In some examples, the contacts 105 are knife contacts.

Figure 3:
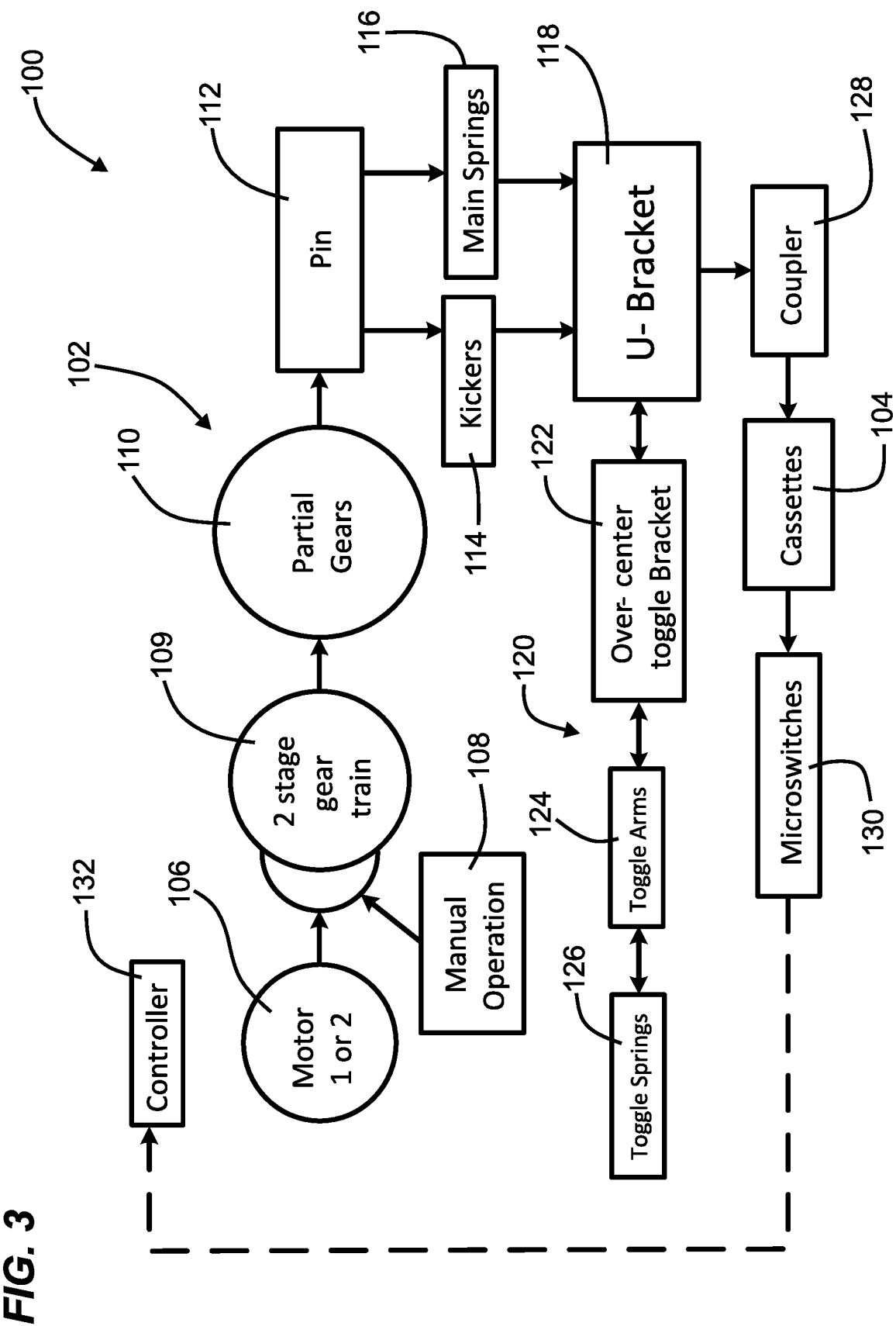
FIG. 3 is a schematic diagram of the transfer switch of FIG. 1.

FIG. 3 shows a schematic of the transfer switch 100. The contactor mechanism 102 includes at least one motor 106, a manual operator 108, a gear train 109 connected to the at least one motor 106 and manual operator 108, partial gears 110, a pin 112, kickers 114, at least one chargeable motivator (e.g., spring or actuator) 116, a u-bracket 118, and a toggle sub-assembly 120. The toggle sub-assembly 120 includes an over-center bracket 122, at least one toggle arm 124, and at least one toggle spring 126. The transfer switch 100 also includes a coupler 128, the contact modules (e.g., cassettes)

104, and at least one microswitch 130. In some examples, the transfer switch 100 includes a controller 132 for controlling the operation of the transfer switch 100.

In some examples, the controller 132 may comprise a device commonly referred to as a microprocessor, central processing unit (CPU), digital signal processor (DSP), or other similar device, and may be embodied as a standalone unit or as a device shared with components of the switch 100. The controller 132 may include memory for storing software instructions, or the switch 100 may further comprise a separate memory device for storing the software instructions that is electrically connected to the controller 132 for the bi-directional communication of the instructions, data, and signals therebetween.

Figure 4:
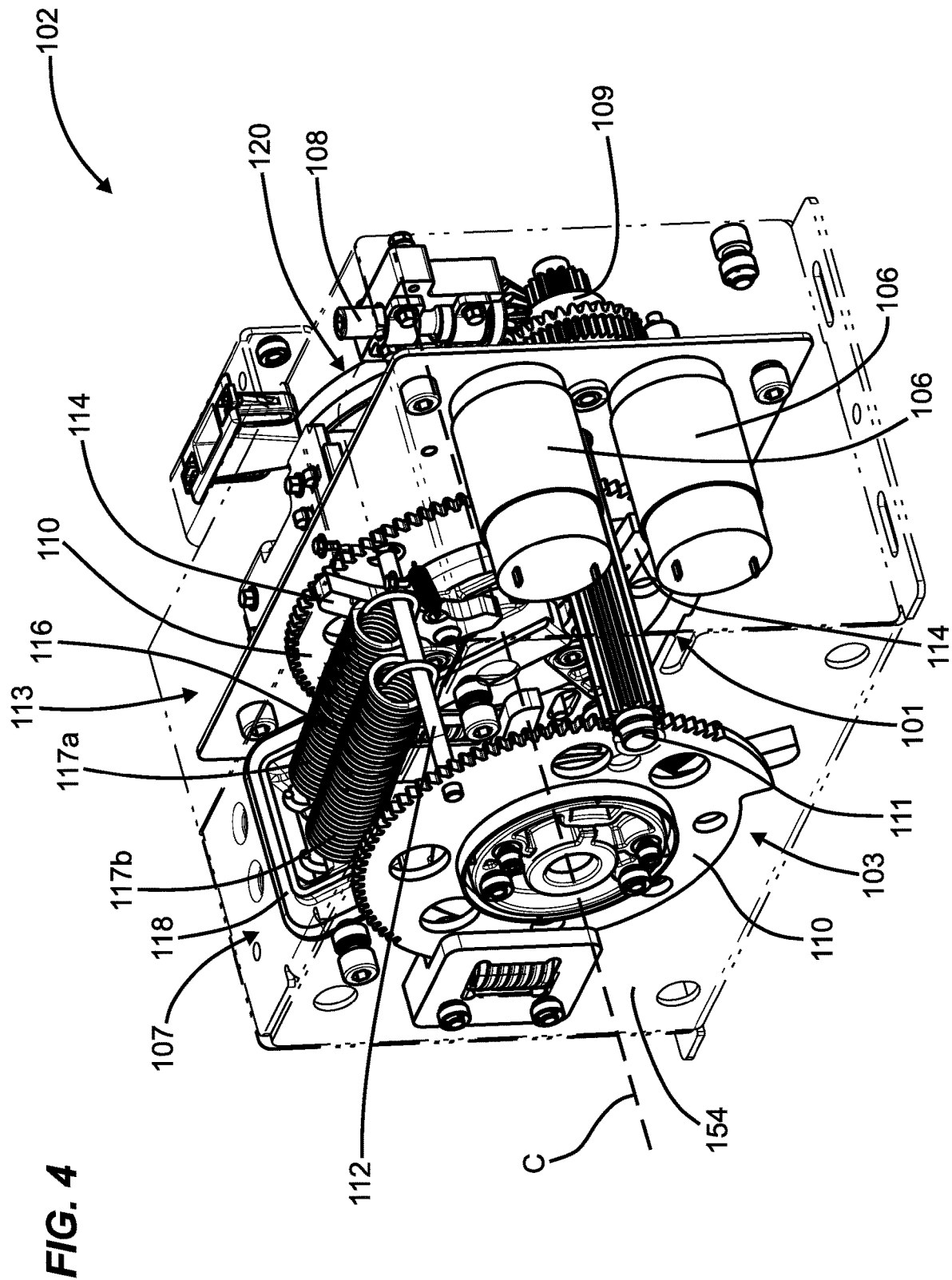
FIG. 4 is a perspective view of the transfer switch of FIG. 1.

FIG. 4 shows a perspective view of the contactor mechanism 102 with housing 154 being represented in broken lines and transparent to show interior components.

Figure 5:
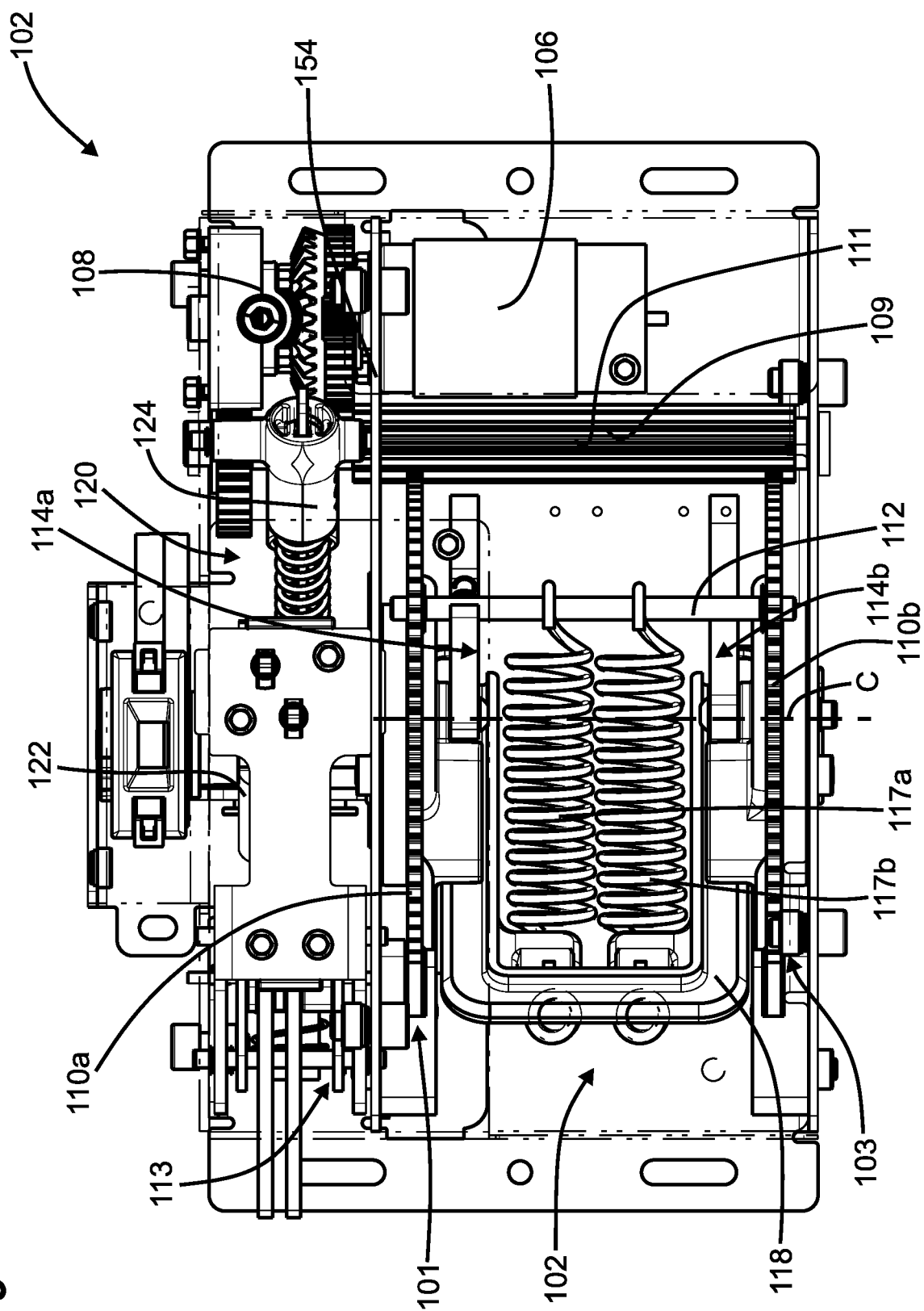
FIG. 5 is a top view of the transfer switch of FIG. 1.

FIG. 5 shows a top view of the contactor mechanism 102 with housing 154 being represented in broken lines and transparent to show interior components.

In some examples, the contactor mechanism 102 includes a first assembly 101 and a second assembly 103. In some examples, the first and second assemblies 101, 103 are positioned in a first compartment 107 adjacent a second compartment 113. As shown, a pair of motors 106 are shown connected to the gear train 109. The gear train 109 is also connected to the manual operator 108. The gear train 109 includes a drive shaft 111 that is in communication with both the first and second assemblies 101, 103. Specifically, the drive shaft 111 is in communication with the partial gears 110, which include first and second partial gears 110a, 110b, and the first and second assemblies 101, 103, respectively. As the motors 106 rotate the drive shaft 111, the drive shaft 111 rotates the partial gears 110. As shown, the pin 112 is connected to the partial gears 110 of the first and second assemblies 101, 103.

The chargeable motivator 116 is shown as including a pair of springs 117a, 117b. The chargeable motivator 116 is shown connected to the u-bracket 118 and the pin 112. The u-bracket 118 is shown in communication with both the first and second assemblies 101, 103. Specifically, the u-bracket rotates around the central axis C.

The kickers 114 include first and second assembly kickers 114a, 114b, of the first and second assemblies 101, 103, respectively. Each first and second assembly kicker 114a, 114b is connected, and movable relative to, the first and the second partial gears 110a, 110b.

The toggle sub-assembly 120 is positioned in the second compartment 113, adjacent the first and second assemblies 101, 103 in the first compartment 107. The over-center bracket 122 is coupled to the u-bracket 118 so that the over-center bracket 122 rotates with the u-bracket 118.

Figure 6:
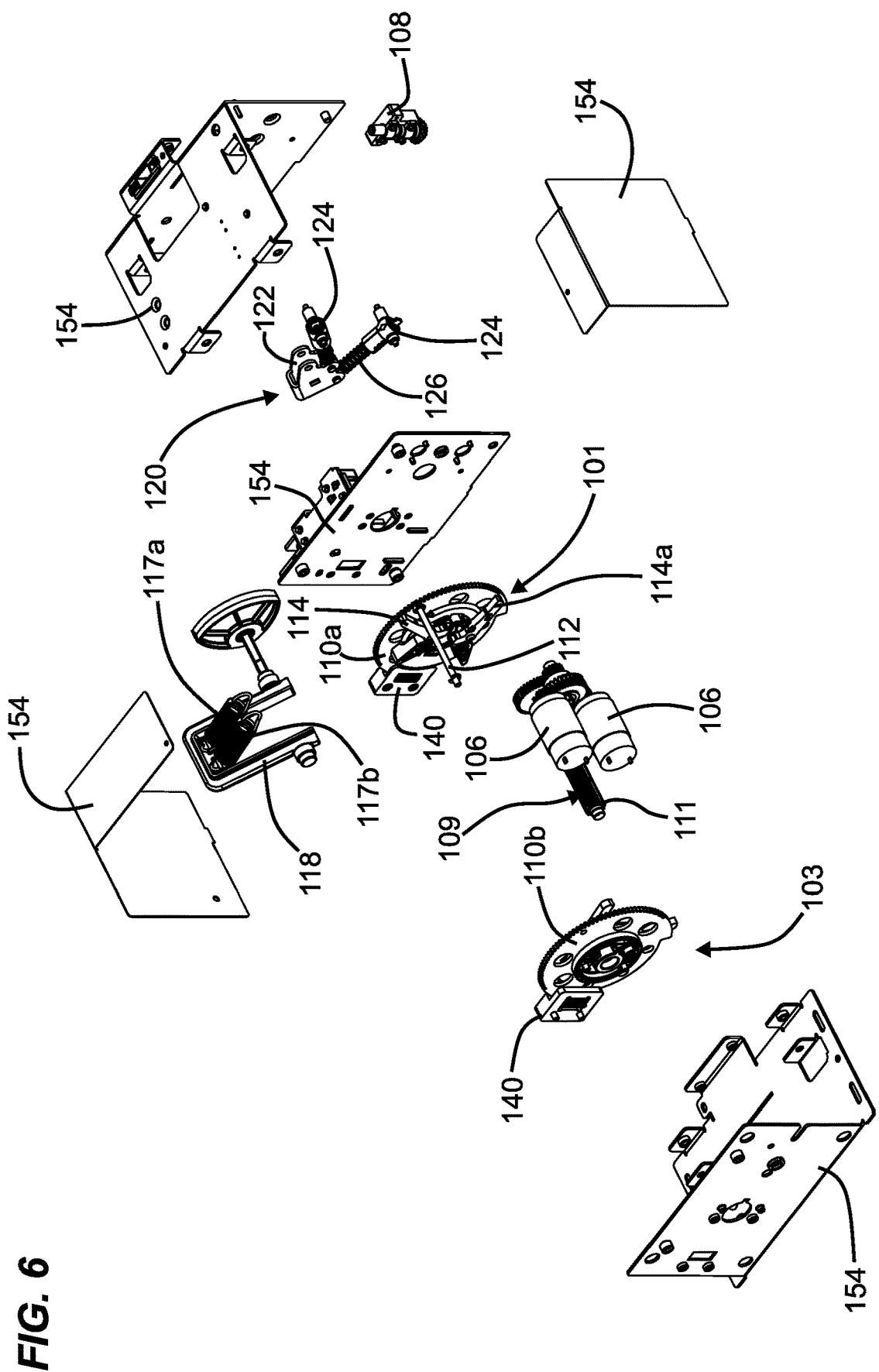
FIG. 6 is a front exploded view of the transfer switch of FIG. 1.
Figure 7:
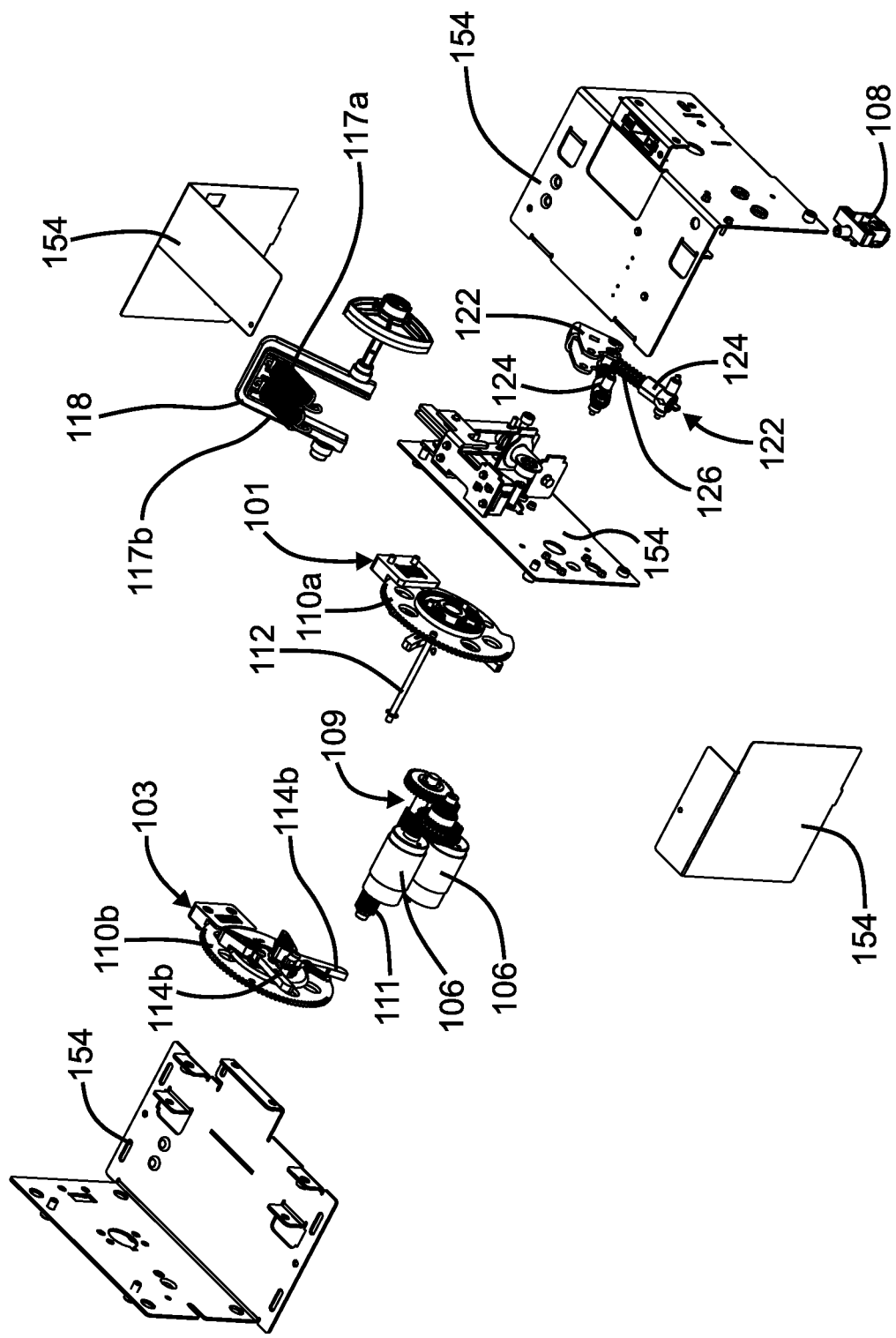
FIG. 7 is a rear exploded view of the transfer switch of FIG. 1.

FIGS. 6 and 7 show a partial exploded perspective view of the contactor mechanism 102.

Figure 8:
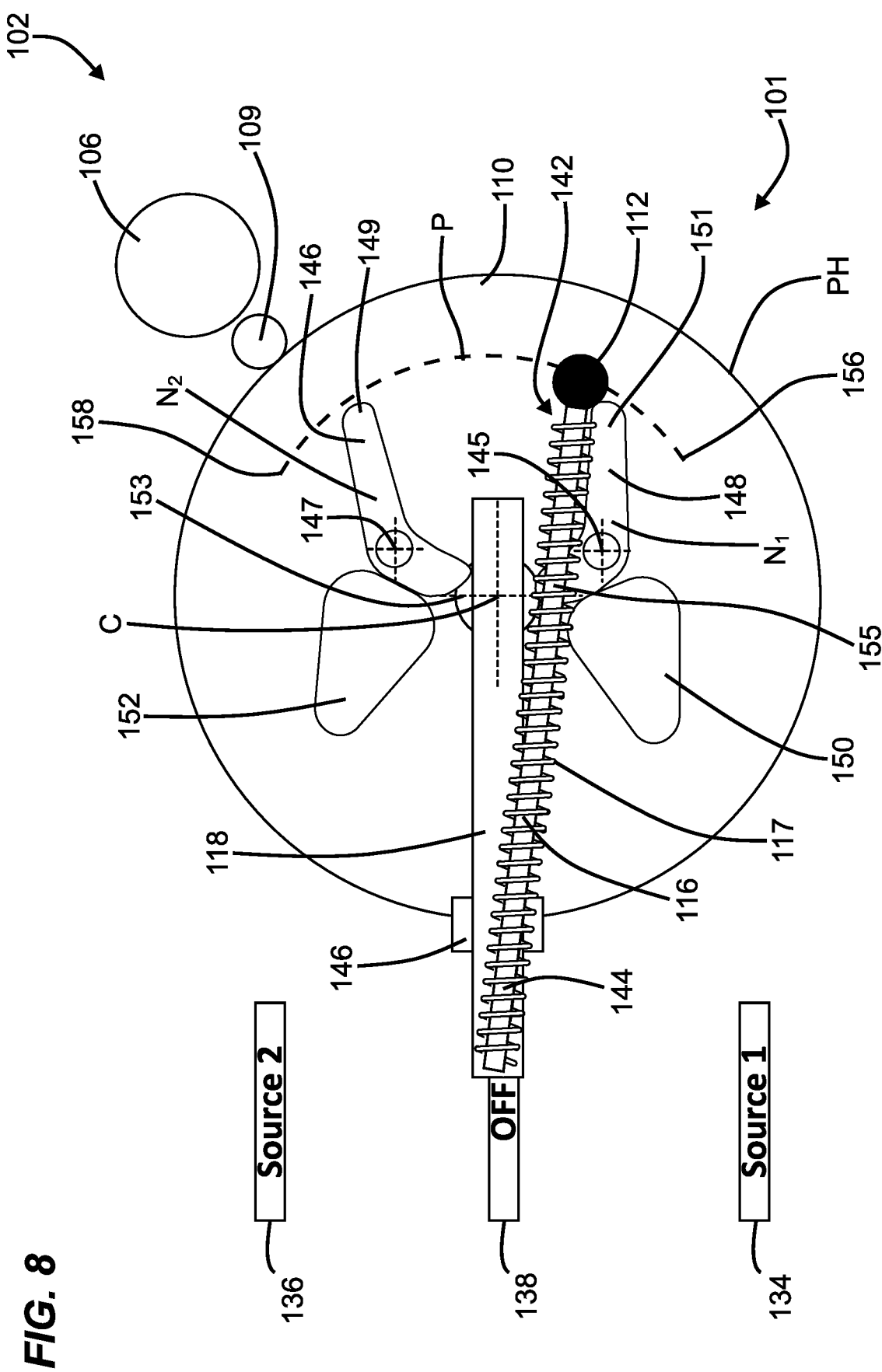
FIG. 8 is a schematic diagram of the transfer switch of FIG. 1 with a u-bracket in an OFF position.

FIG. 8 shows a schematic view of a portion of the contactor mechanism 102. In FIG. 8, the first assembly 101 is shown. In some examples, the first and second assemblies 101, 103 are substantially similar. In some examples, the pin 112 and u-bracket 118 are connected to both the first assembly 101 and the second assembly 103.

The contactor mechanism 102, specifically the u-bracket 118, has at least a first source position 134 and a second source position 136 that correspond with source 1 and source 2. In some examples, the contactor mechanism 102 has an OFF position 138 that does not select either of source 1 or source 2. As shown, the u-bracket 118 is shown in the OFF position 138. In some examples, the contactor mechanism 102 includes a holder to hold the u-bracket 118 in the first source position 134, second source position 136, or OFF position 138. In some examples, the holder is the toggle sub-assembly 120.

The motor 106 rotates the gear train 109 (which includes the drive shaft 111) which rotates the partial gears 110 about the central axis C. The motor 106 allows the gear train 109 to be rotated at high torque. In some examples, the motor 106 can be operated automatically. In some examples, the motor 106 can be operated remotely. In some examples, the gear train 109 can also be rotated by the manual operator 108.

Each partial gear 110 includes an interface at a periphery PH that mates with the gear train 109 so that the partial gear 110 is rotatable about the central axis C. In some examples, the interface is a plurality of gear teeth (e.g., shown in FIG. 18). In some examples, the partial gear 110 only includes gear teeth at a portion of the periphery PH.

The pin 112 is attached to the partial gear 110, and therefore moves simultaneously with the partial gear 110. The pin 112 has a path of travel P, indicated by dashed lines, that has a first end 156 and a second end 158. In some examples, the pin 112 is a cylindrical shaft.

The kicker 114a includes a first kicker 146 and a second kicker 148 and aids in moving the u-bracket 118 between source 1 and 2. The first kicker 146 and the second kicker 148 are each independently rotatable about kicker axes 145, 147, respectively. The kickers 146, 148 each contact the pin 112 at pin contacting ends 149, 151 and each kicker 146, 148 contacts the u-bracket 118 at u-bracket contacting ends 153, 155. In some examples, the kickers 146, 148 urge the u-bracket 118 between the first and second source positions 134, 136. In some examples, the kickers 146, 148 are spring biased to neutral positions N1, N2, as shown in FIG. 4. In some examples, the kickers 146, 148 are spring biased toward one another.

The chargeable motivator 116 is configured to aid in moving the u-bracket 118 with the pin 112. The chargeable motivator 116 has a first end 142 connected to the pin 112 and a second end 144 connected to the u-bracket 118. The chargeable motivator 116 is offset from the central axis C and at least partially charged upon movement of the pin 112 to motivate the movement of the u-bracket 118 between the first and second source positions 134, 136.

In the depicted example, the chargeable motivator 116 includes a spring 117. In some examples, the chargeable motivator 116 includes a plurality of springs. In some examples, the chargeable motivator 116 is a helical spring. As the spring 117 is stretched, it becomes charged. In some examples, the chargeable motivator 116 is an actuator.

In some examples, the chargeable motivator 116 is discharged when the u-bracket 118 is positioned at the first source position 134 or the second source position 136. In some examples, the chargeable motivator 116 is charged when the u-bracket 118 is positioned between the first source position 134 and the second source position 136. In some examples, the chargeable motivator 116 is charged when the u-bracket 118 moves from the first source position 134 to the OFF position 138 or from the second source position 136 to the OFF position 138. In some examples, the chargeable motivator 116 is discharged and urges the u-bracket 118 from the OFF position 138 to the second source position 136 or from the OFF position 138 to the first source position 134. In some examples, the chargeable motivator 116 is charged when the u-bracket 118 moves from the second source position 136 to the OFF position 138. In some examples, the chargeable motivator 116 is discharged and urges the u-bracket 118 from the OFF position 138 to the first source position 134.

The u-bracket 118 is connected to the chargeable motivator 116 and rotatable around the central axis C. In some examples, the u-bracket 118 moves at least one electrical contact 105 within the attached contact module 104. Therefore, movement of the u-bracket 118 controls the energy source to which the switch 100 connects.

In some examples, the contactor mechanism 102 includes a first mechanical stop 150 and a second mechanical stop 152. The first mechanical stop 150 stops the rotation of the u-bracket 118 when the u-bracket 118 is in the first source position 134, and the second mechanical stop 152 stops the rotation of the u-bracket 118 when the u-bracket 118 is in the second source position 136. In some examples, the first and second mechanical stops 150,152 can include a cushioning element so as to dampen the contact between the first and second mechanical stops 150,152 and the u-bracket 118. In some examples, the first and second mechanical stops 150, 152 are integral with the partial gears 110.

To aid in controlling the speed of rotation of the partial gears 110, some examples include a brake 140 configured to contact and selectively slow the partial gears 110. In some examples, the brake 140 can be used to quickly stop the rotation of the partial gears 110 so that the pin 112 does not over rotate outside of the path P.

Figure 9:
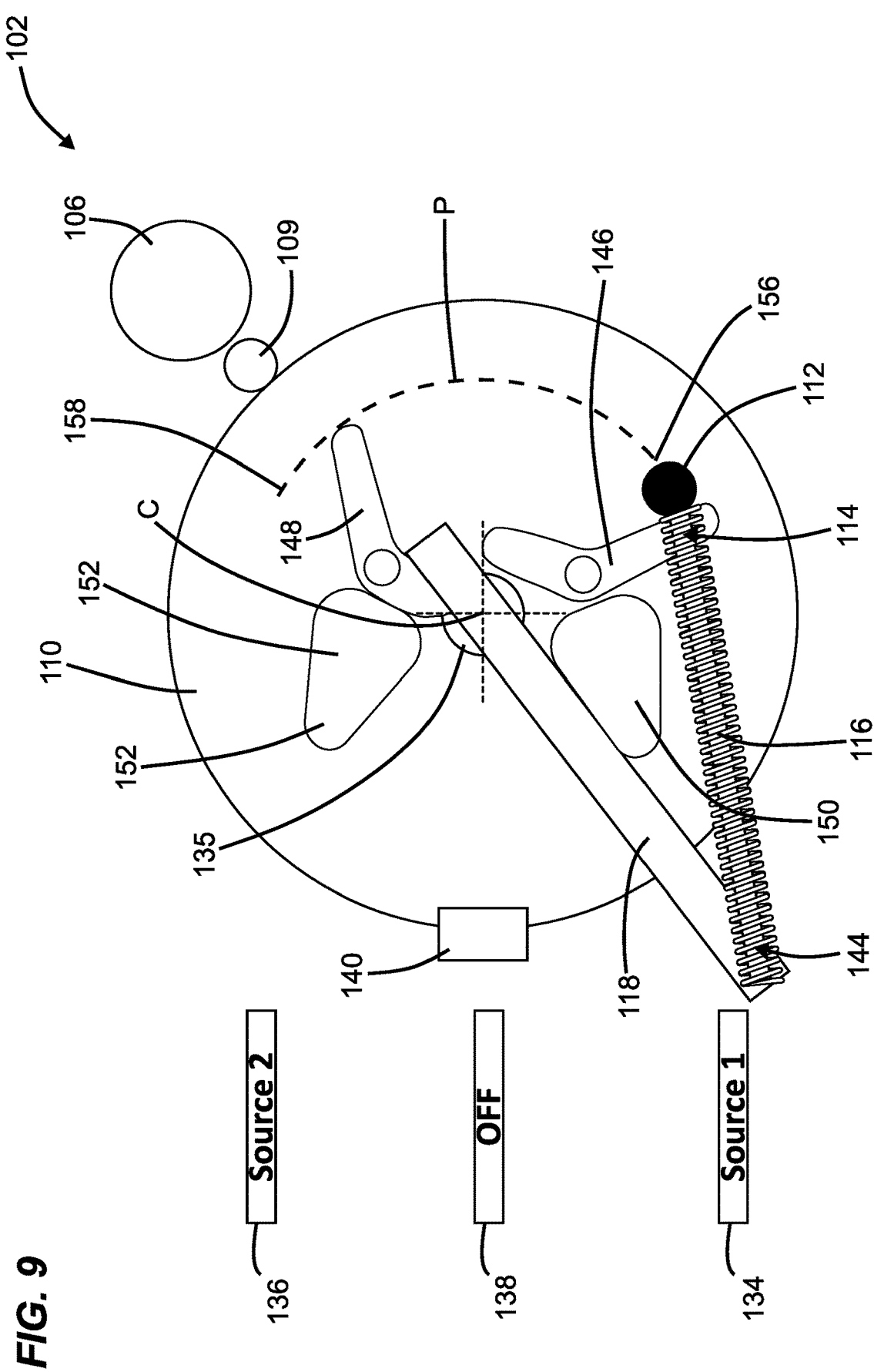
FIG. 9 is a schematic diagram of the transfer switch of FIG. 1 with the u-bracket in a first source position.

FIG. 9 shows the u-bracket 118 in the first source position 134. In some examples, when the source 1 is selected by the u-bracket 118, the u-bracket 118 contacts the first mechanical stop 150. As shown, the chargeable motivator 116 is discharged. As shown, the first kicker 146 is positioned against the pin 112. In the depicted embodiment, because the first kicker 146 is biased toward the second kicker 148 and because the first kicker 146 is positioned at least partially behind the pin 112, as the pin 112 moves toward the first end 156 of the path P, the first kicker 146 follows.

Figure 10:
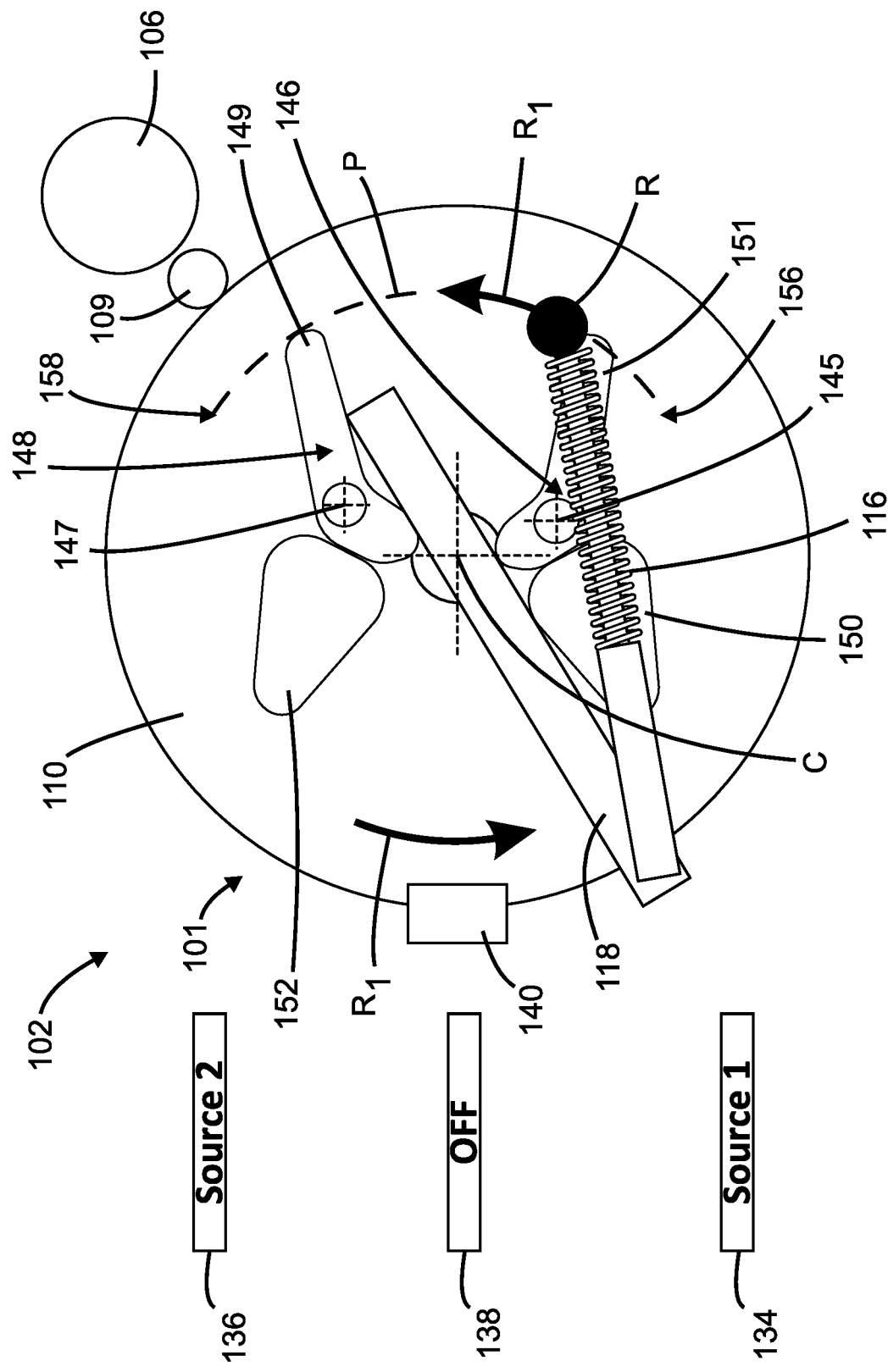
FIG. 10 is another schematic diagram of the transfer switch of FIG. 1 with the u-bracket in the first source position with a pin moving along a path of travel.

FIG. 10 shows the u-bracket 118 in the first source position 134 but the pin 112 partially moved along its path P toward the second end 158, away from the first end 156. Such movement of the pin 112 is caused by rotation of the partial gears 110 about the central axis C. The rotation of the partial gears 110 is caused by rotation of gear train 109 caused by rotation of the connected motor 106. As indicated by arrows R1, the partial gears 110 are rotated in a counter-clockwise direction when moving from the first source position 134 and the second source position 136.

As shown, the pin contacting end 151 of the first kicker 146 is again positioned against the pin 112 due to its bias toward the second kicker 148. In some examples, the first kicker 146 will contact the pin 112 until the first kicker returns to the neutral position N1.

The chargeable motivator 116 is shown being charged as the pin 112 moves toward the second end 158 of the path P.

Figure 11:
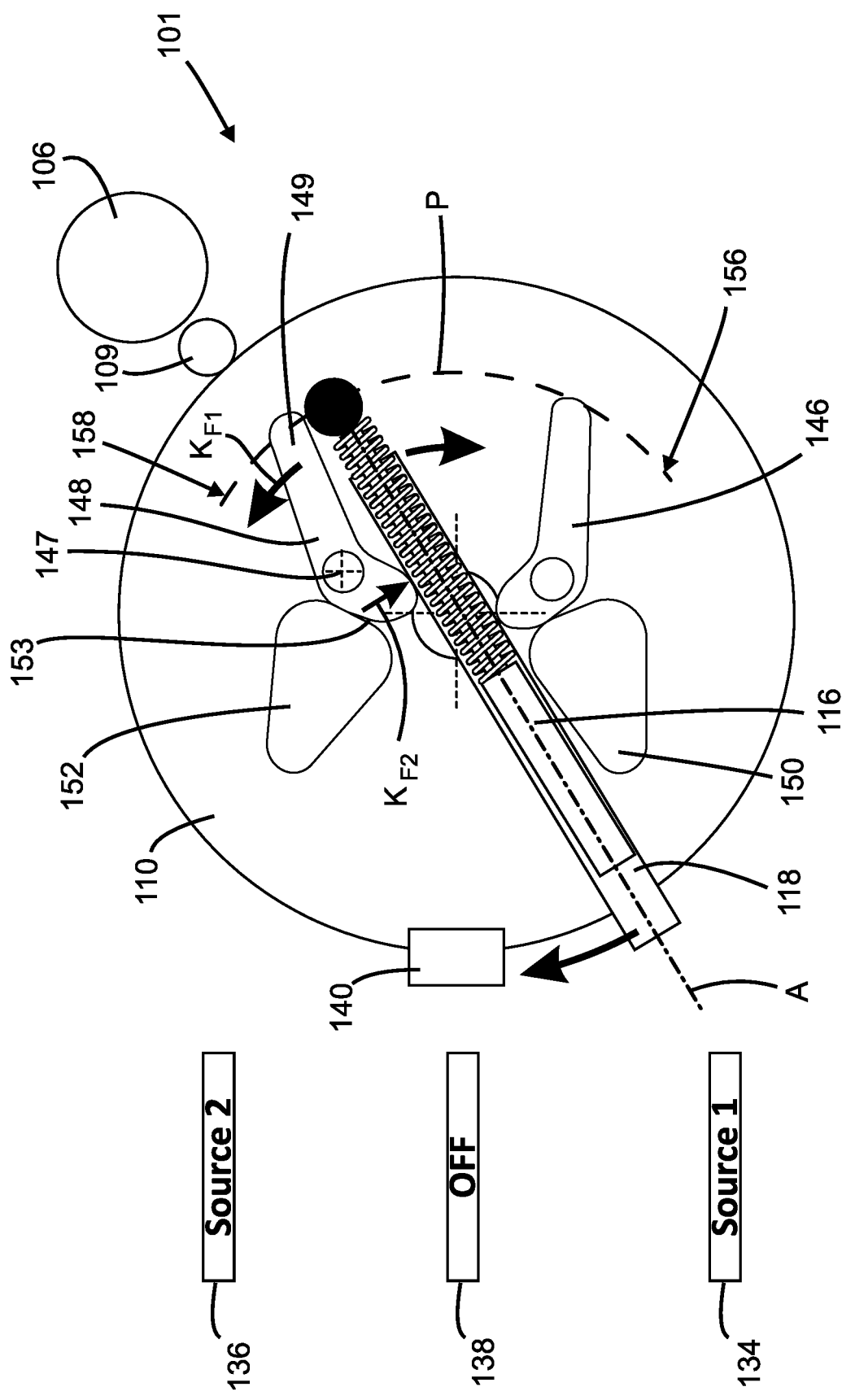
FIG. 11 is another schematic diagram of the transfer switch of FIG. 1 with the u-bracket in the first source position with the pin aligned with a u-bracket.

FIG. 11 shows the u-bracket 118 in the first source position 134 with the pin 112 moved along its path P closer toward the second end 158, away from the first end 156, compared to what is shown in FIG. 10. The first kicker 146 is shown in the neutral position N1. The second kicker 148, and specifically the pin contacting end 149, is shown contacting the pin 112. The second kicker 148 is positioned away from its neutral position N2 and rotated about its kicker axis 147. The u-bracket 118 has a longitudinal axis A that is aligned with the pin 112. At this point, because the pin 112 and longitudinal axis A of u-bracket 118 are aligned, the chargeable motivator 116 is fully charged.

The u-bracket 118 is moved from the first source position 134 toward the second source position 136 by utilizing two forces.

First, the u-bracket 118 utilizes the force exerted by the chargeable motivator 116 as the motivator 116 discharges as the pin 112 and longitudinal axis A of u-bracket 118 become misaligned. Said another way, as the pin 112 moves closer to the second end 158 of the path P, the pin 112 moves over the longitudinal axis A (e.g., over-center), and misaligns with, the longitudinal axis A of u-bracket 118. This misalignment causes the chargeable motivator 116 to discharge and pull the u-bracket 118 toward the second source position 136. Not only can this force be exerted quickly once the pin 112 misaligns with the u-bracket 118, but the force can help break any electromagnetic forces or welds in the contact modules 104 to which the u-bracket 118 is attached.

Second, the u-bracket 118 utilizes the force exerted on the u-bracket by the second kicker 148. As the pin 112 rotates in a counterclockwise direction, powered by the motor 106, the pin 112 exerts a first kicker force KF1 against the second kicker 148 to rotate the second kicker 148 about the kicker axis 147. The second kicker 148 then exerts a substantially similar force as KF1, second kicker force KF2, at the u-bracket contacting end 153 against the u-bracket 118. This causes this u-bracket 118 to rotate about the central axis C, toward the second source position 136, as indicted by arrows.

Because the movement of the pin 112 is powered by way of the motor 106, which is capable of high torque and speeds, and the pin 112 transfers the first kicker force KF1 against the second kicker 148, the second kicker force KF2 exerted on the u-bracket contains a high enough torque to quickly decouple the first source position 134 and couple the second source position 136. Like the chargeable motivator 116, the force exerted by the motor 106 can help break any electromagnetic forces or welds in the contact modules 104 to which the u-bracket 118 is attached. This quick decoupling and coupling minimizes the electrical arc that is generated when the knife contacts 105 in the contact modules 104 electrically disconnect and connect.

Figure 12:
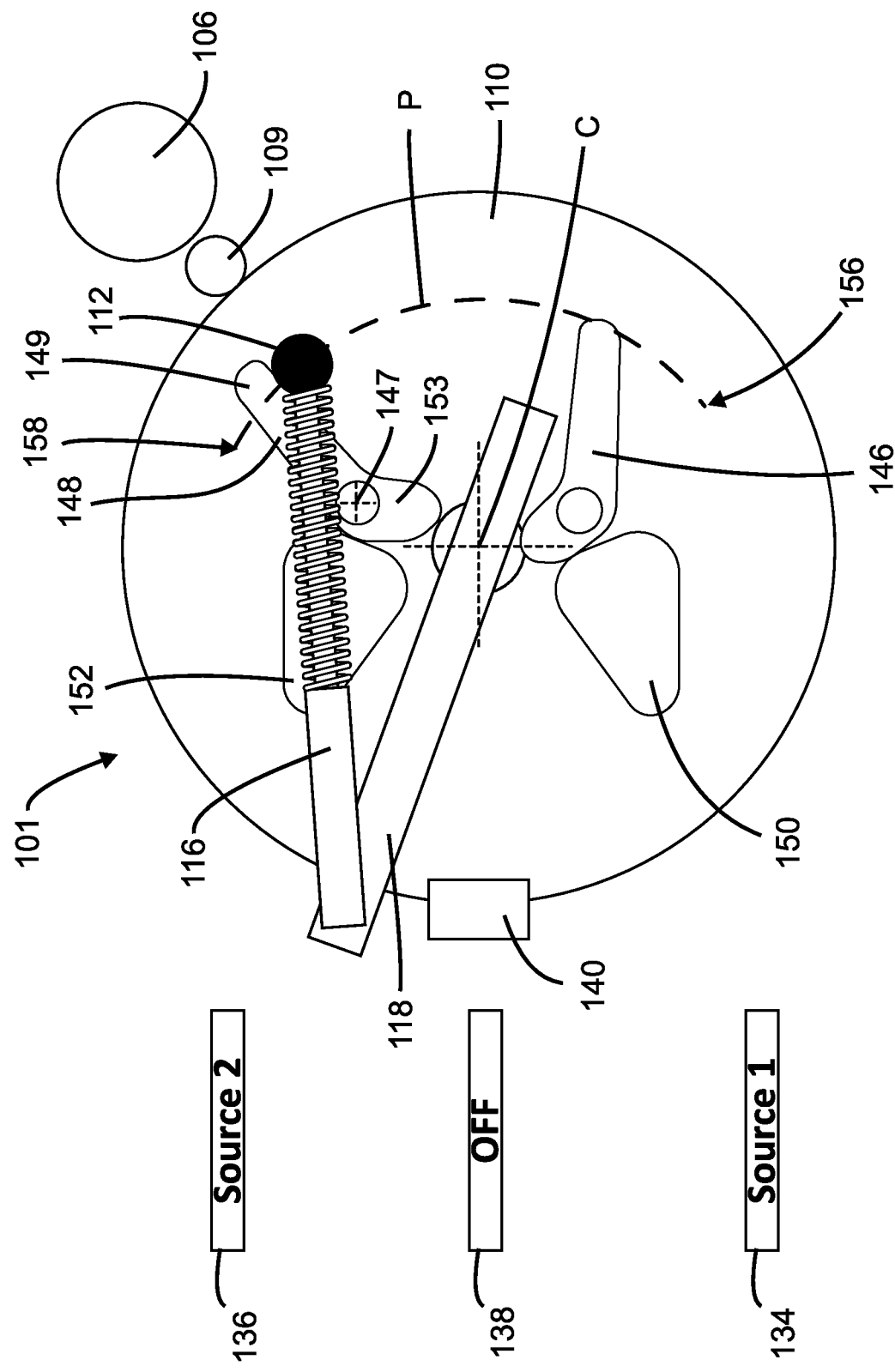
FIG. 12 is a schematic diagram of the transfer switch of FIG. 1 with the u-bracket between the first source position and a second source position.

FIG. 12 shows the u-bracket 118 between the first source position 134 and the second source position 136 with the pin 112 moved along its path P closer toward the second end 158, away from the first end 156, compared to what is shown in FIGS. 10 and 11. The first kicker 146 is shown in the neutral position N1 and the second kicker 148, and specifically the pin contacting end 149, is shown contacting the pin 112 and exerting the second kicker force KF2 against the u-bracket 118. Due to the shape of the pin contacting end 149 and the offset positioning of the axis 147 from the central axis C, the second kicker 148 continues to exert the second kicker force KF2 against the u-bracket 118.

Figure 13:
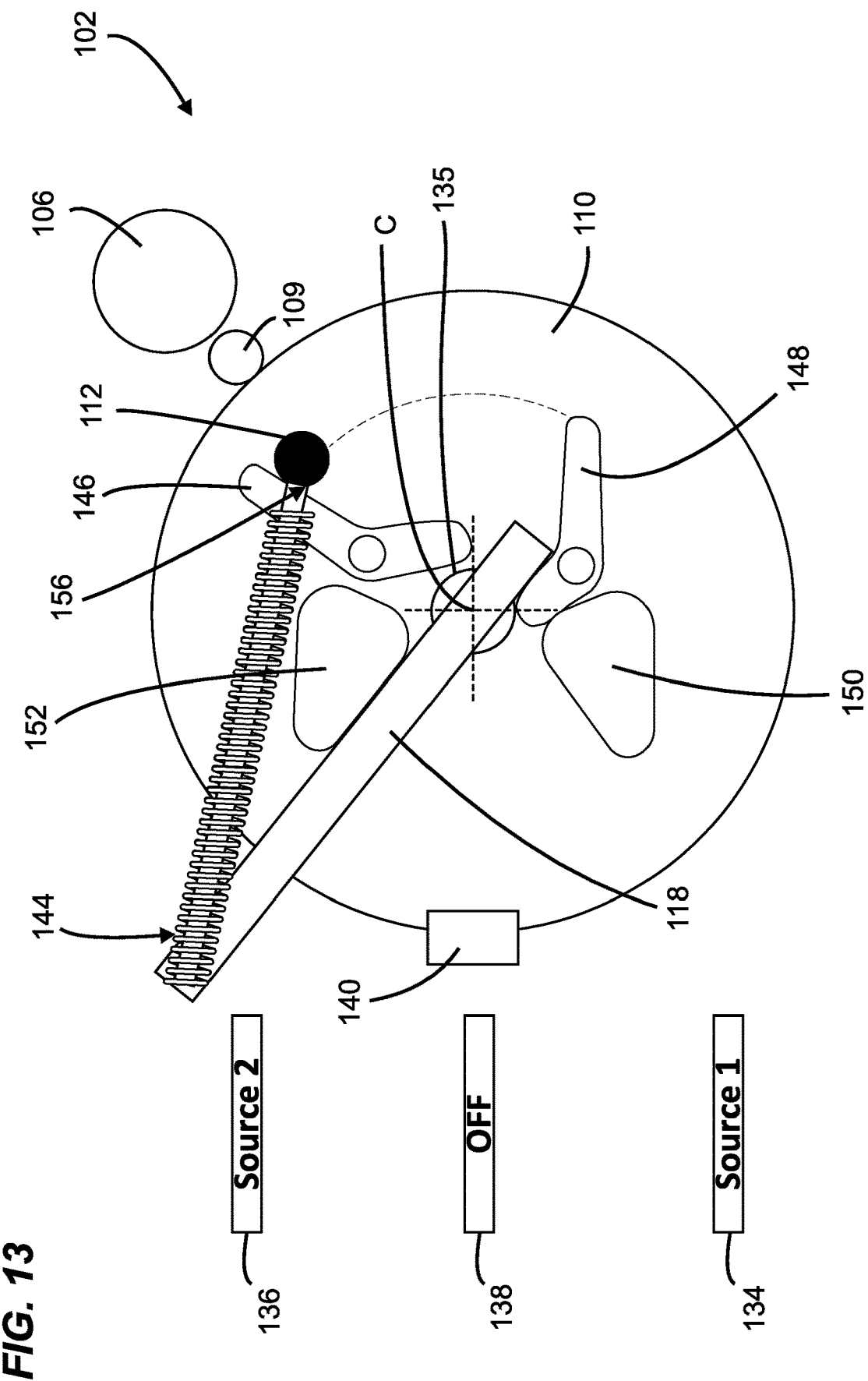
FIG. 13 is a schematic diagram of the transfer switch of FIG. 1 with the u-bracket in the second source position.

FIG. 13 shows the u-bracket 118 in the second source position 136 with the pin 112 positioned at the second end 158 of the path P. The first kicker 146 is shown in the neutral position N1 and the second kicker 148, and specifically the pin contacting end 149, is shown contacting the pin 112. The u-bracket 118 is shown contacting the second mechanical stop 152.

The first assembly 101 utilizes similar motions when the u-bracket 118 moves from the second source position 136 to the first source position 134. Specifically, the chargeable motivator 116 and first kicker 146 exert similar forces against the u-bracket 118 to urge the u-bracket 118 toward the first source position 134. Further, while the operation of the first assembly 101 is described in detail, the second assembly 103 operates in a substantially similar manner.

Because the pin 112 and u-bracket 118 are attached to both the first and second assemblies 101, 103, the first and second assemblies operate in concert.

Figure 14:
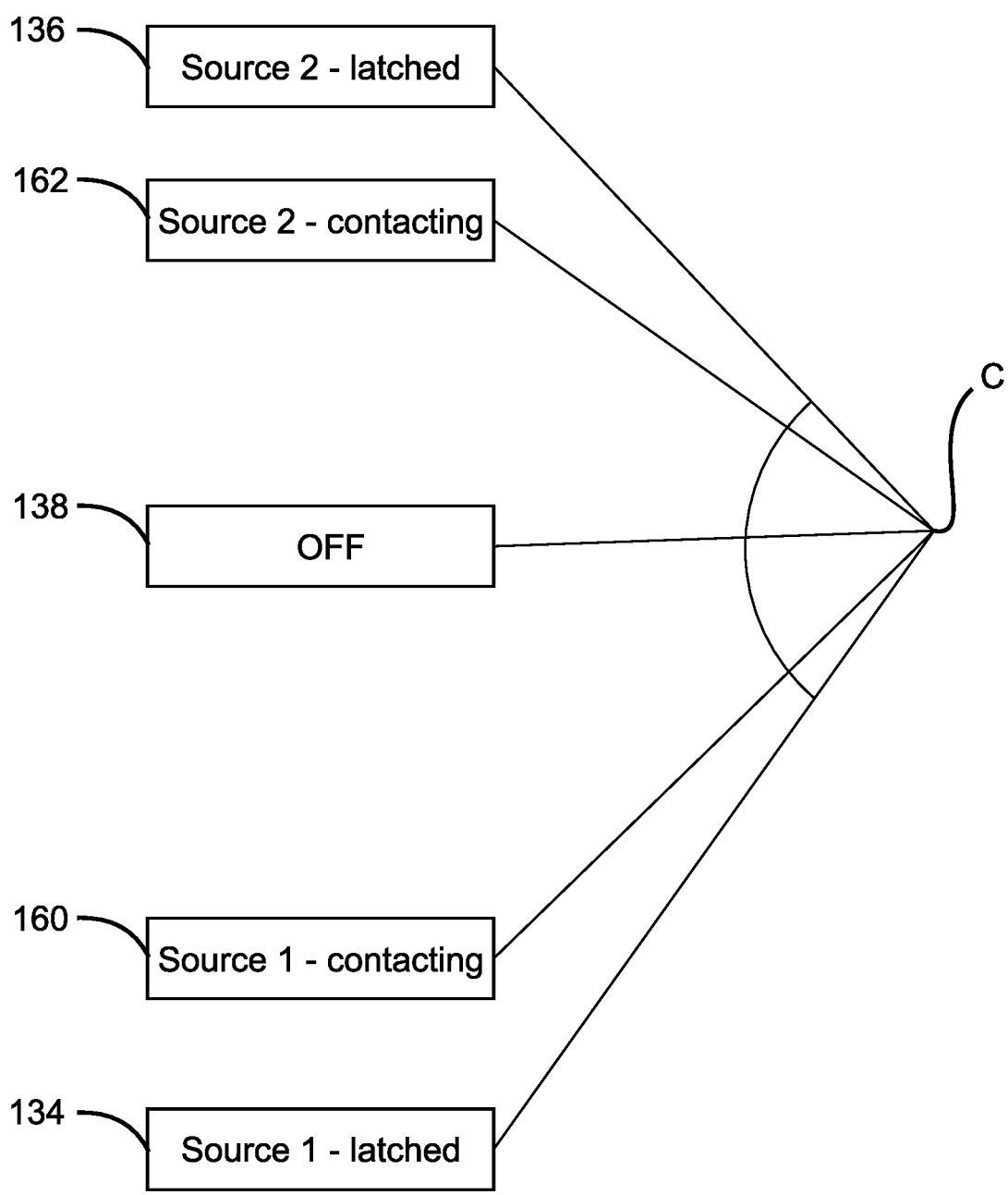
FIG. 14 is a schematic diagram of positions of a u-bracket of the transfer switch of FIG. 1.

FIG. 14 shows a schematic of the first assembly 101. Lines are shown representing the u-bracket 118 as it rotates around the central axis C. When the u-bracket 118 is in the first or second source position 134, 136, the contacts 105 in the contact module 104 are latched and held latched by way of the toggle sub-assembly 120. When the u-bracket 118 is in a first source contact make position 160 and second source contact make position 162, the contacts 105 in the contact module 104 are in contact with one another, but are not latched together. When the u-bracket 118 is in the OFF position 138, the u-bracket 118 is held in the OFF position 138 by way of the toggle sub-assembly 120.

In some examples, when moving from the first source position 134 to the OFF position 138 or the second source position 136 to the OFF position 138, a force greater than 200 in/lbs is utilized. In some examples, when moving from the first source position 134 to the OFF position 138 or the second source position 136 to the OFF position 138, a force greater than 300 in/lbs is utilized. In some examples, when moving from the first source position 134 to the OFF position 138 or the second source position 136 to the OFF position 138, a force greater than 400 in/lbs is utilized.

In some examples, the switch 100, specifically the contactor mechanism 102, must break the first or second source electrical connection faster than a set amount of time to avoid excessive arcing. In certain examples, the switch 100 must break the first or second source electrical connection and make the first or second source electrical connection within a set amount of time. In other examples, the switch 100 must not break the first or second source electrical connection and make the first or second source electrical connection faster than a set amount of time. In some examples, the first or second source electrical connection must not be broken and the first or second source electrical connection be made in less than 15 milliseconds. In some examples, the u-bracket 118 travels from either the first source contact make position 160 to the OFF position 138 or from the second source contact make position 162 to the OFF position 138 in less than 10 milliseconds. In some examples, when in the OFF position 138, the u-bracket 118 can be held in such a position for less than 50 milliseconds or greater than 8 milliseconds. Further, in some examples, the u-bracket 118 can be held in in the OFF position 138 indefinitely until released.

In some examples, when moving from the OFF position to either the first source position 134 or the second source position 136, the u-bracket moves at a speed greater than 150 RPM and less than 350 RPM. In some examples, when moving from the OFF position 138 to either the first source position 134 or the second source position 136, the u-bracket moves at a speed greater than 190 RPM and less than 306 RPM.

Figure 15:
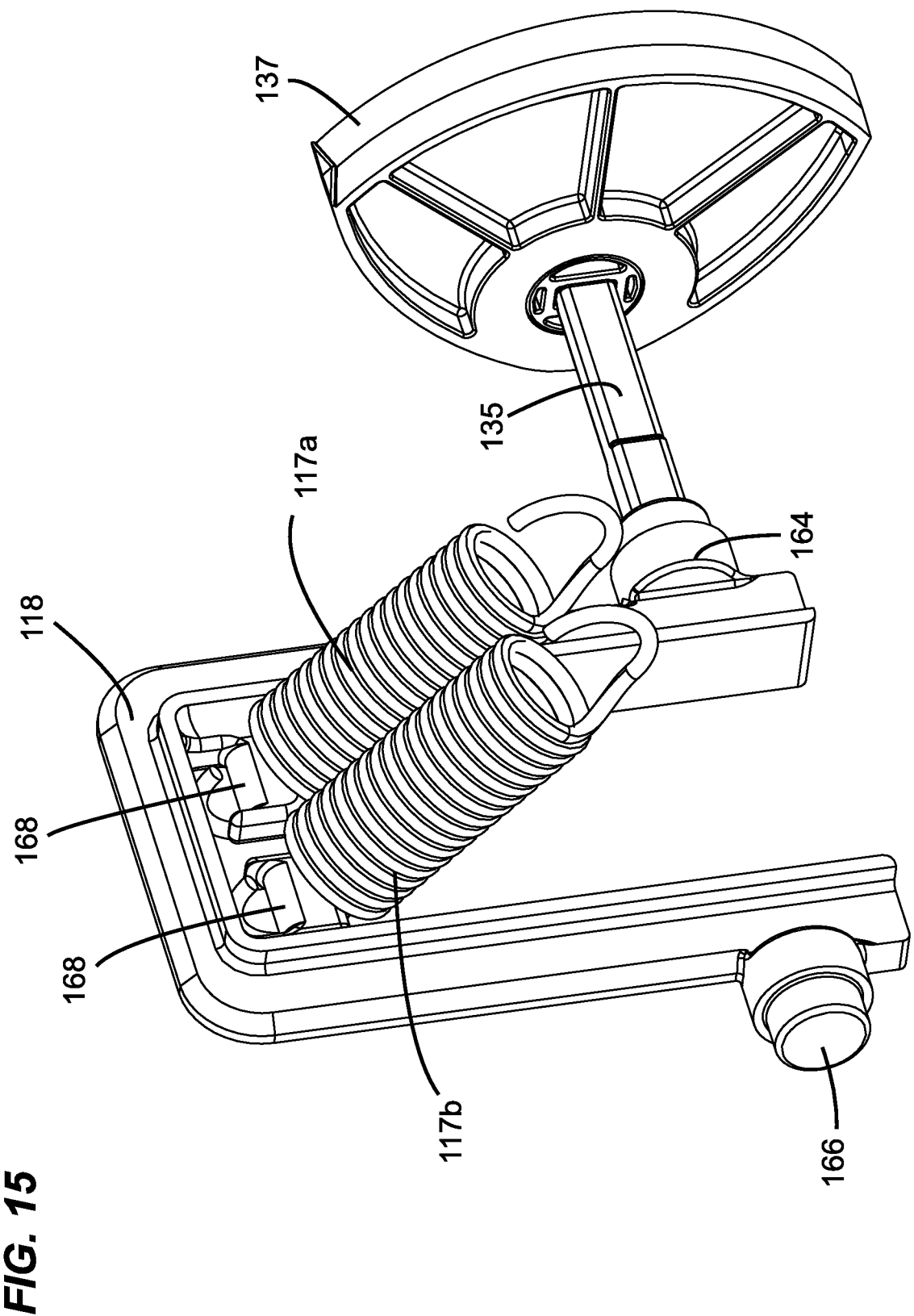
FIG. 15 is a perspective view of a u-bracket and output shaft of the transfer switch of FIG. 1.

FIG. 15 shows a perspective view of the u-bracket 118 coupled to an output shaft 135. The u-bracket 118 includes a first end 164 and a second end 166. In some examples, the first end 164 is received at the first assembly 101 and the second end 166 is received at the first end 164. Further, the u-bracket 118 includes attachments 168 to attach the springs 117a, 117b of the chargeable motivator 116 thereto.

The output shaft 135 includes a flywheel 137 attached thereto. The output shaft 135 is configured to be attached to the contact module 104 so as to move the knife contacts 105 within in the contact modules 104. In some examples, the flywheel 137 aids in the rotation of the output shaft 135. In some examples, the output shaft 135 is attached to the coupler 128 which connects to the contact module 104.

Figure 16:
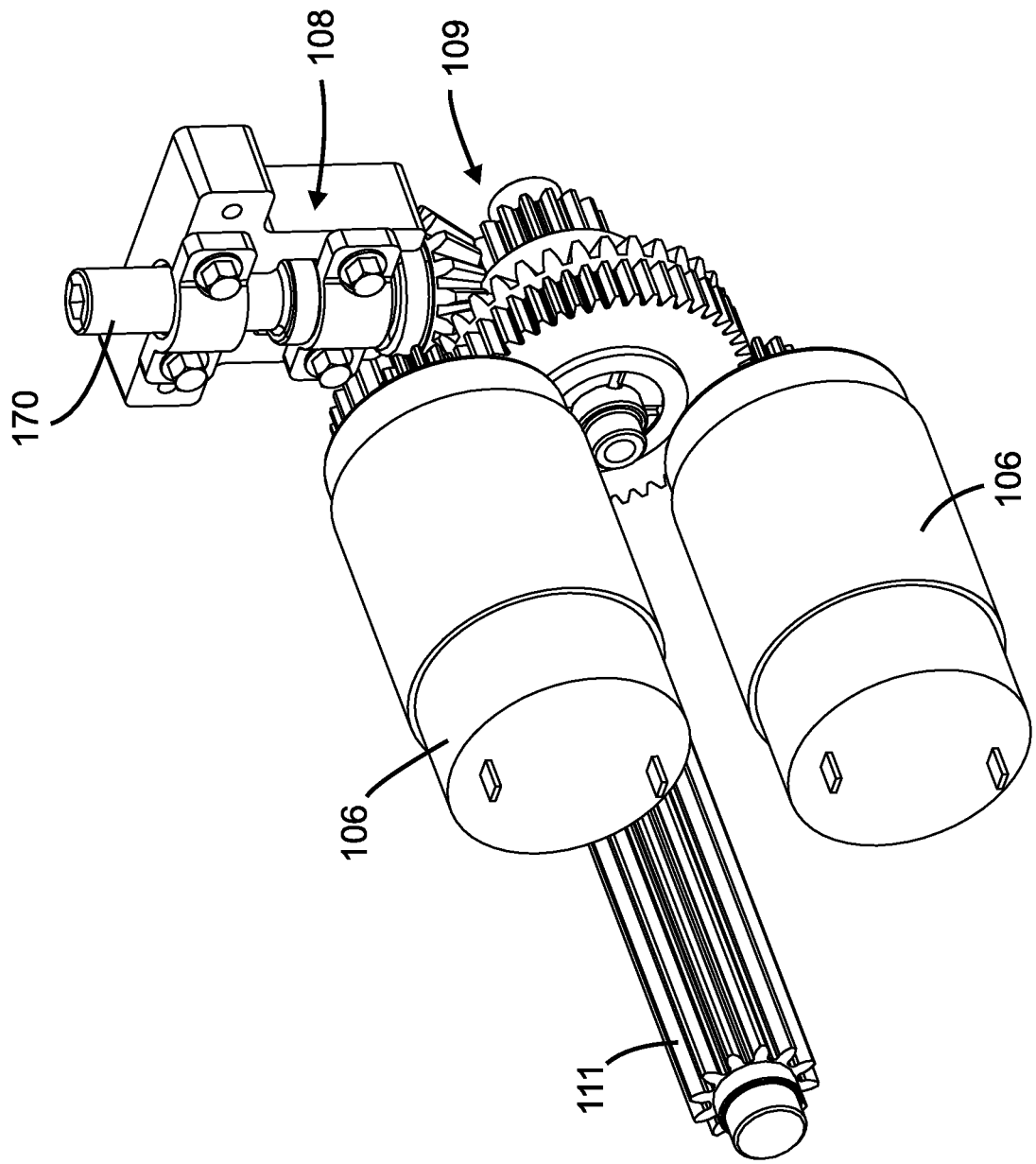
FIG. 16 is a perspective view of motors, a gear train, and a manual operator of the transfer switch of FIG. 1.
Figure 17:
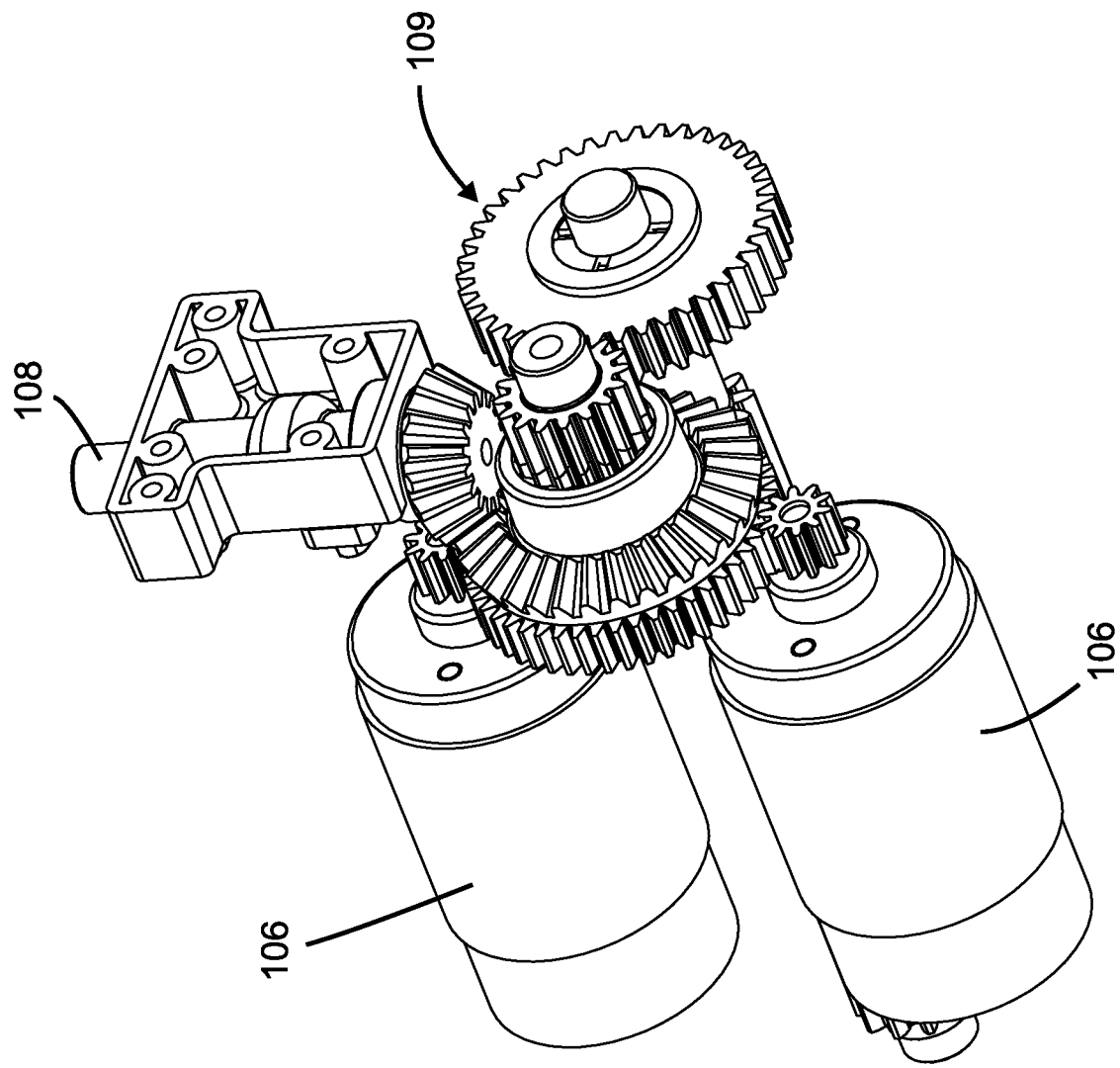
FIG. 17 is another perspective view of motors, a gear train, and a manual operator of the transfer switch of FIG. 1.
Figure 18:
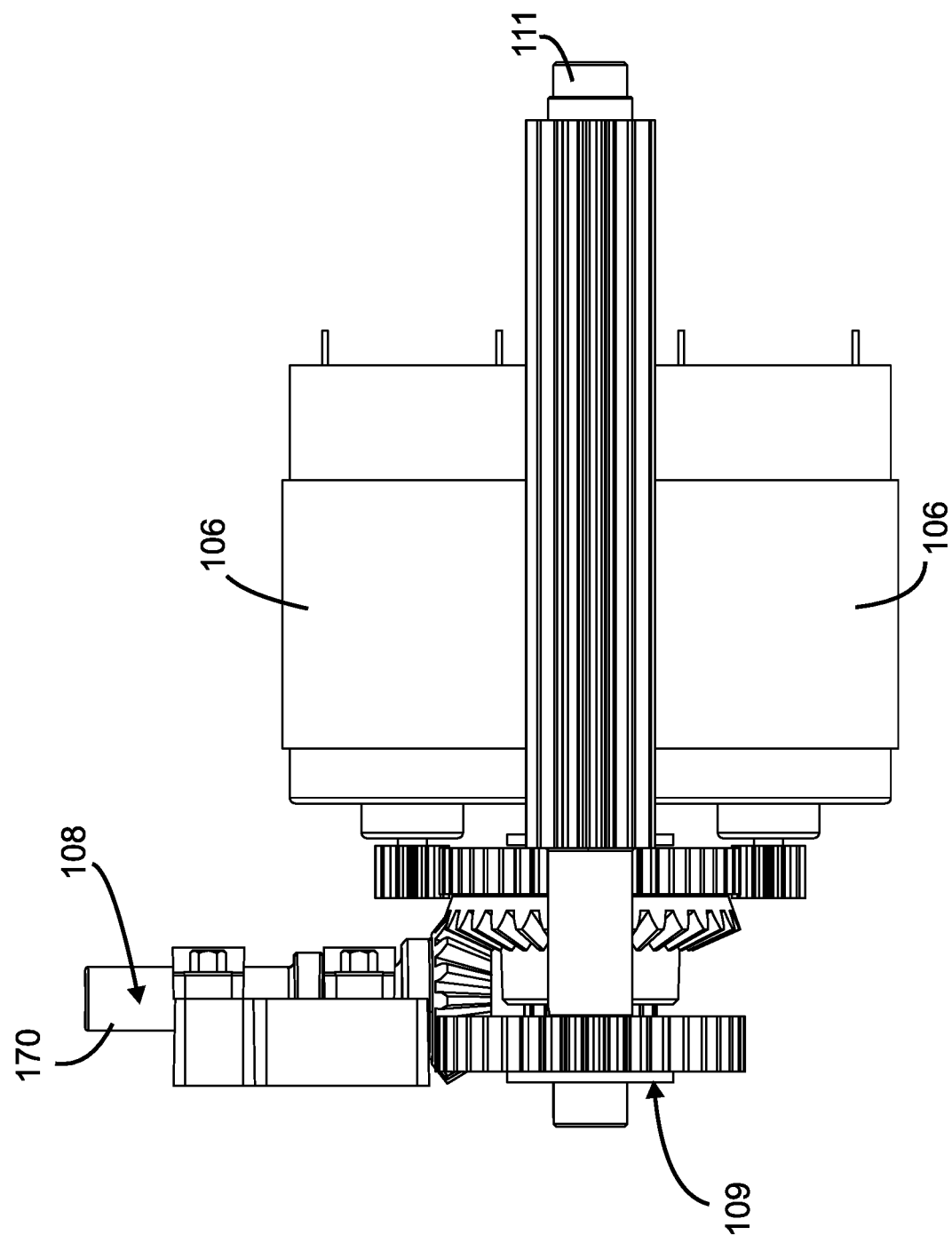
FIG. 18 is a top view of motors, a gear train, and a manual operator of the transfer switch of FIG. 1.

FIGS. 16-18 show views of the motors 106 and manual operator 108 attached to the gear train 109. The gear train 109 is shown to include the drive shaft 111. In some examples, the motors 106 or the manual operator 108 can drive the rotation of the drive shaft 111. In some examples, the motors 106 are electric motors. In some examples, a shaft 170 of the manual operator 108 can be rotated, such as, by a tool.

Figure 19:
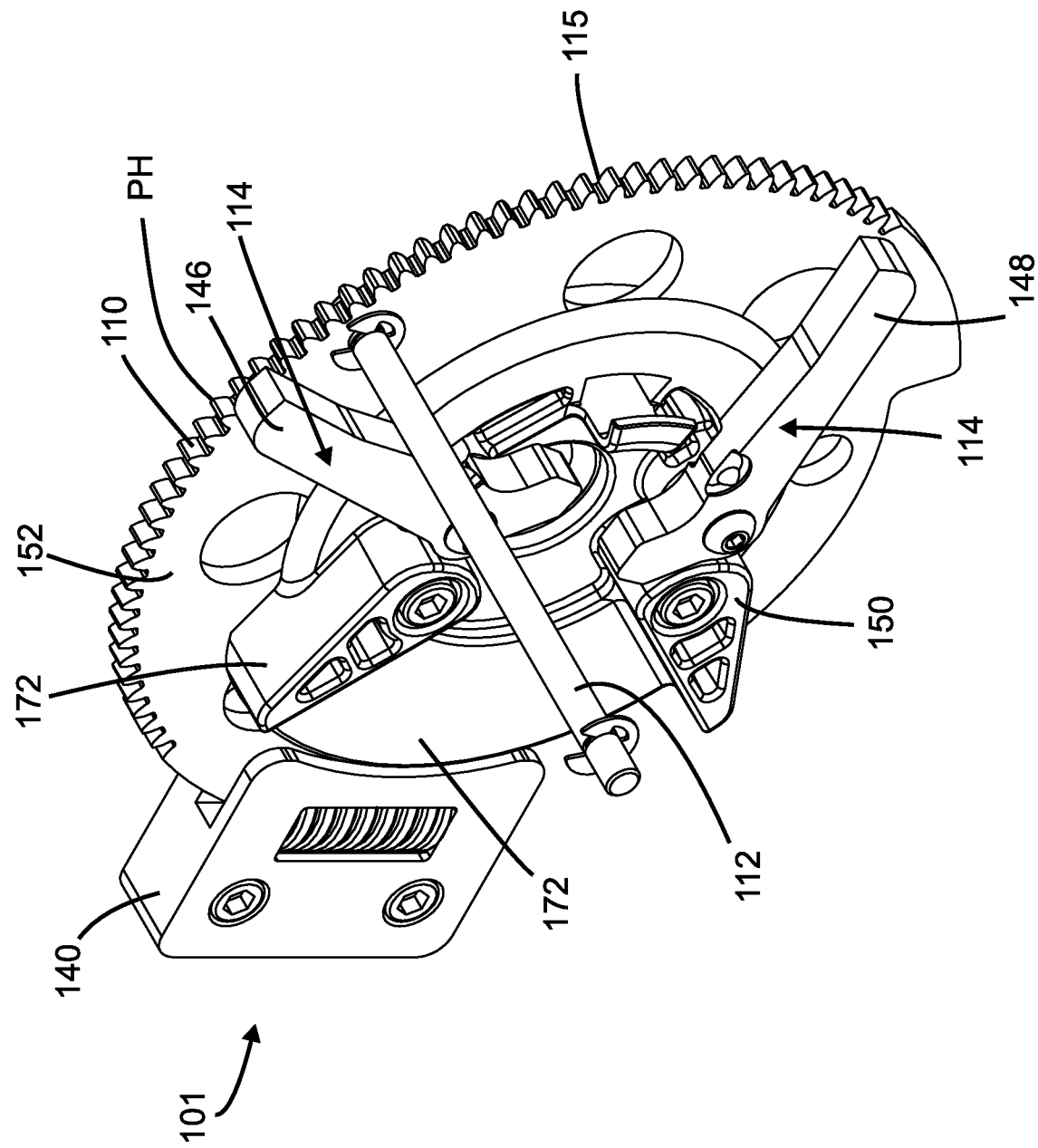
FIG. 19 is a perspective view of a partial gear of the transfer switch of FIG. 1.
Figure 20:
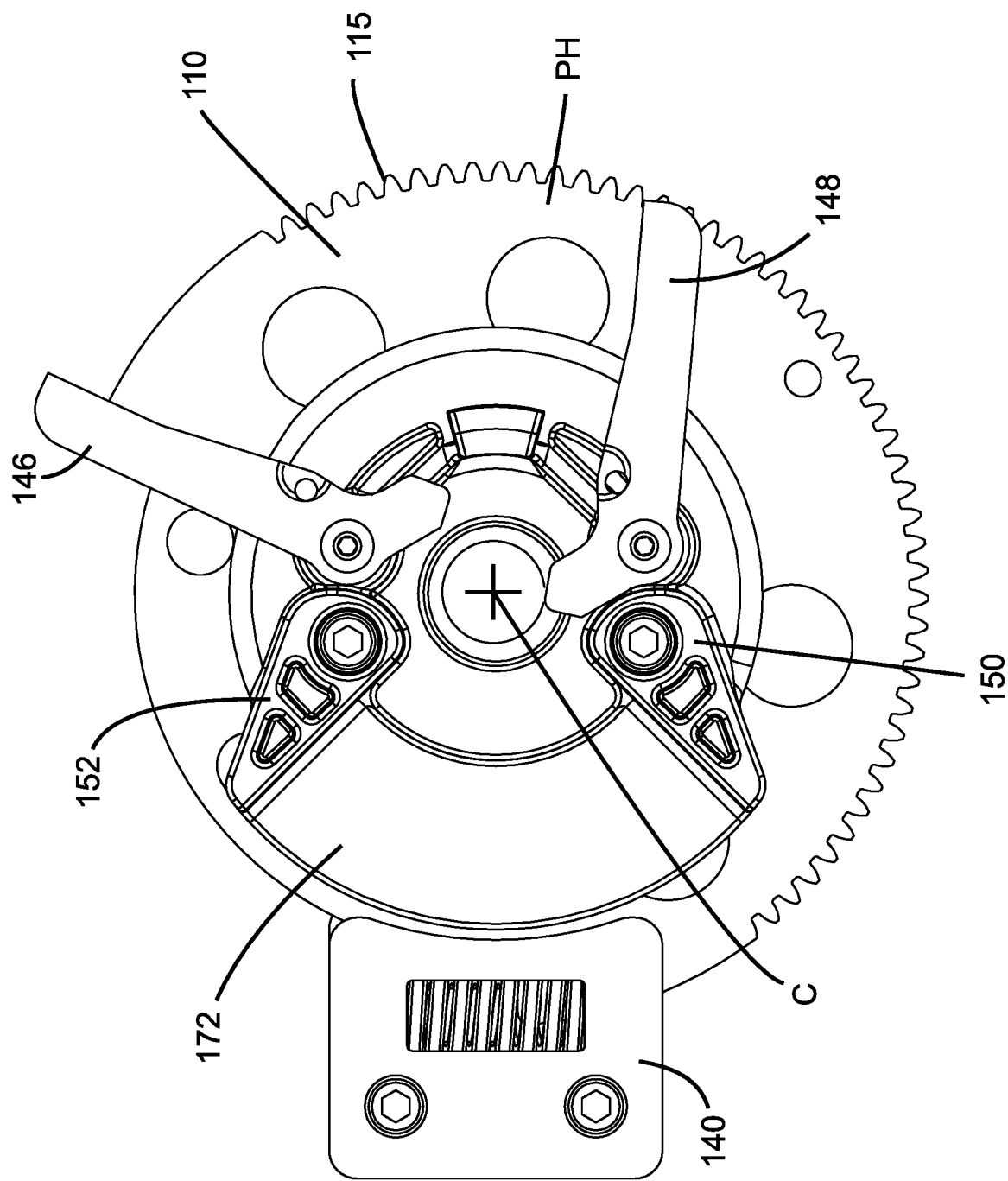
FIG. 20 is a front view of a partial gear of the transfer switch of FIG. 1.

FIGS. 19-20 show views of the first assembly 101. As noted above, the second assembly is substantially similar to the first assembly 101, therefore the following description describes components of both the first and second assemblies 101, 103. As noted above, the partial gears 110 of each of the first and second assemblies 101 and 103 each include teeth 115 and are connected to one another by the pin 112. In some examples, the teeth 115 are offset from the central axis C and positioned at the periphery PH of the partial gears 110. In some examples, the partial gears 110 are simultaneously driven by the drive shaft 111 to move the pin 112.

As shown, the partial gear 110 is rotatable relative to the first and second mechanical stops 150, 152, the kickers 114, and the brake 140. In some examples, the first and second mechanical stops 150, 152, kickers 114, and brake 140 are fixed relative to the housing 154. In some examples, the first and second mechanical stops 150, 152 and kickers are attached to a hub 172 that is attached to the housing 154.

Figure 21:
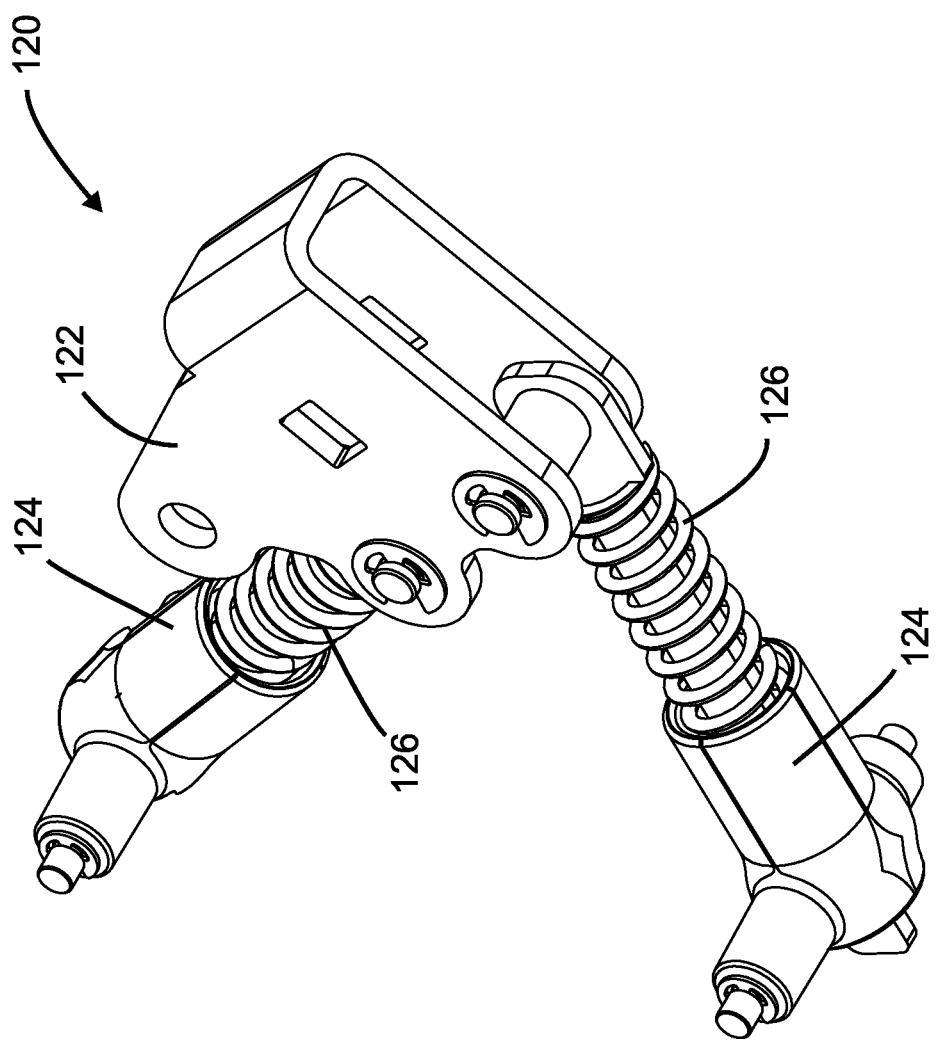
FIG. 21 is a perspective view of a toggle sub-assembly of the transfer switch of FIG. 1.

FIG. 21 shows a perspective view of the toggle sub-assembly 120. The toggle sub-assembly 120 can function as a holder to hold the u-bracket 118 in at least one of the first source position 134, the second source position 136, or the OFF position 138. In some examples, the toggle sub-assembly 120 is connected to the output shaft 135 and helps to hold the u-bracket 118 using over-center forces. In some examples, the toggle arms 124 are pistons and configured to hold the over-center bracket 122. In some examples, the toggle arms 124 are charged via the toggle spring 126. In some examples, the toggle arms 124 can be gas pistons. In some examples, the toggle arms 124 are electrically controllable.

Figure 22:
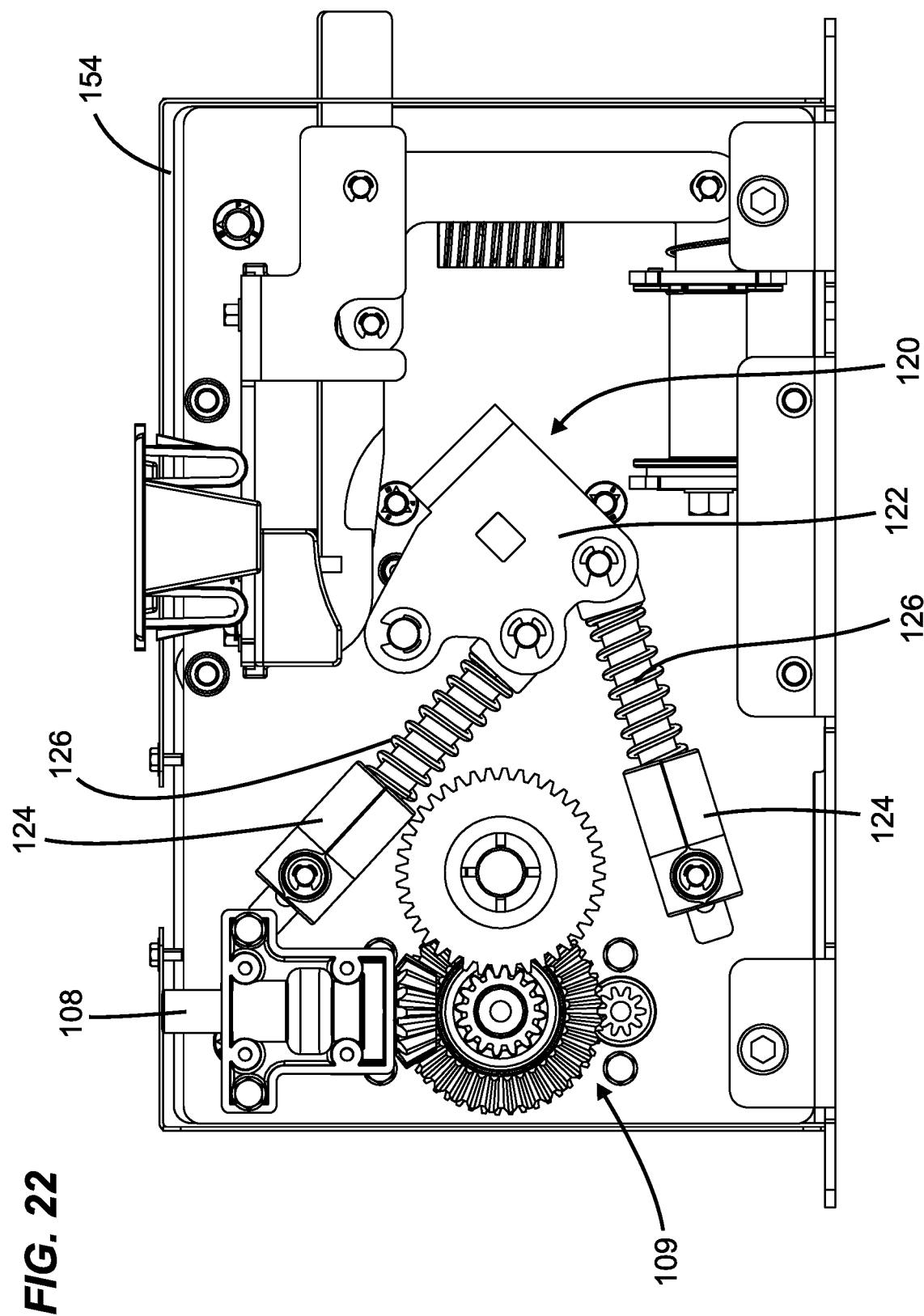
FIG. 22 is a side view of a toggle sub-assembly of the transfer switch of FIG. 1 in a first position.
Figure 23:
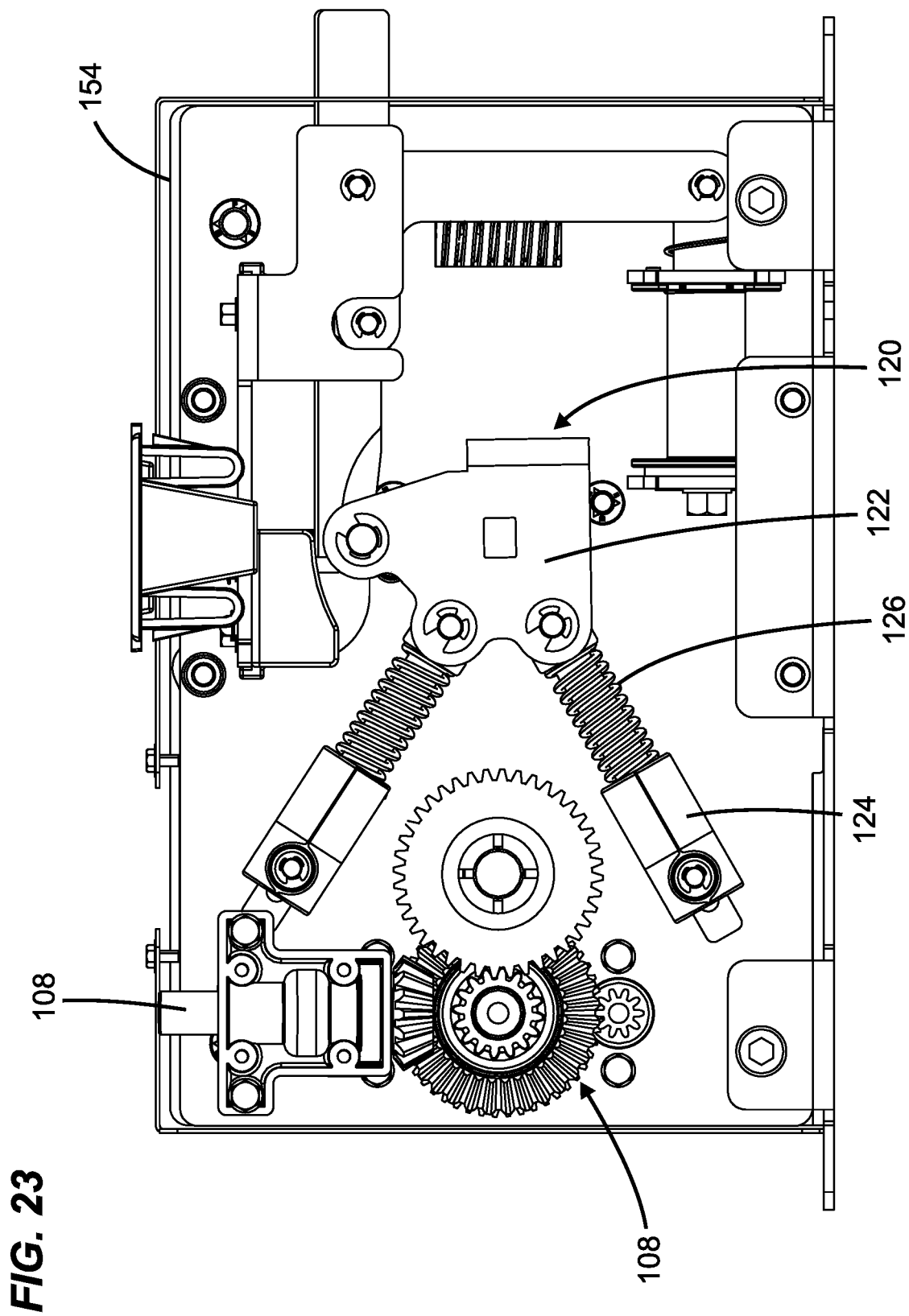
FIG. 23 is a side view of a toggle sub-assembly of the transfer switch of FIG. 1 in a second position.

FIGS. 22 and 23 show the toggle sub-assembly 120 in a pair of different positions on the contactor mechanism 102. As shown, the toggle arms 124 can be extended and retracted to control the rotational movement of the over-center bracket 122.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. An automatic transfer switch comprising:
   a motor;
   a drive shaft rotatable by the motor;
   a gear rotatable by the drive shaft, the gear having a plurality of teeth offset from a central axis of the gear, wherein the teeth are engageable by the drive shaft;
   a pin attached to, and movable with, the gear, the pin being offset from the central axis of the gear;
   a bracket rotatable around the central axis of the gear and connected to an output shaft, the bracket being rotatable separately from the gear, wherein upon rotation of the bracket, the output shaft rotates, the bracket having at least a first source position and a second source position, wherein the first and second source positions are different;
a chargeable motivator having a first end and a second end, the first end being connected to the pin and the second end being connected to a portion of the bracket offset from the central axis, wherein the chargeable motivator is at least partially charged upon movement of the pin to motivate the movement of the bracket between the first and second source positions; and
a module connected to the output shaft and including at least one movable electrical contact, wherein the at least one electrical contact moves upon rotation of the output shaft.

2. The automatic transfer switch of claim 1, further comprising a gear rotation brake, wherein the gear rotation brake reduces the speed at which the gear rotates.

3. The automatic transfer switch of claim 1, further comprising a first kicker and a second kicker, wherein the first kicker and the second kicker contact the bracket to urge the bracket between the first and second source positions.

4. The automatic transfer switch of claim 1, wherein the bracket has an OFF position between the first and second source positions.

5. The automatic transfer switch of claim 1, wherein the chargeable motivator includes at least one spring.

6. The automatic transfer switch of claim 1, wherein the chargeable motivator includes a pair of springs.

7. The automatic transfer switch of claim 1, wherein the drive shaft is rotatable by a manually operated gear, separate from the motor.

8. The automatic transfer switch of claim 1, wherein the motor is a first motor and the drive shaft is rotatable by the first motor and a second motor.

9. The automatic transfer switch of claim 1, further comprising a first mechanical stop and a second mechanical stop, wherein the first mechanical stop stops the rotation of the bracket when the bracket is in the first source position, and wherein the second mechanical stop stops the rotation of the bracket when the bracket is in the second source position.

10. The automatic transfer switch of claim 1, wherein the gear is a first gear, wherein the automatic transfer switch further includes a second gear rotatable by the drive shaft and with the first gear, wherein the pin is attached to, and movable with, the first and second gears.

11. The automatic transfer switch of claim 3, further comprising a first gear rotation brake and a second gear rotation brake, wherein each gear rotation brake reduces the speed at which the first and second gears rotate, respectively.

12. The automatic transfer switch of claim 1, further comprising a holder configured to hold the bracket in at least one of the first or second source positions.

13. The automatic transfer switch of claim 12, wherein the holder includes a pair of arms configured to hold the bracket in at least one of the first or second source positions.

14. The automatic transfer switch of claim 13, wherein the arms are charged via springs.

15. The automatic transfer switch of claim 13, wherein the arms are charged with gas.

16. An electrical contactor mechanism for an automatic transfer switch comprising:
a housing;
a first motor mounted within the housing;
a second motor mounted within the housing;
a drive shaft rotatable simultaneously by the first and second motors;
a first gear mounted within the housing and rotatable by the drive shaft, the first gear having a plurality of teeth offset from a central axis of the first gear, wherein the teeth are engageable by the drive shaft;
a second gear mounted within the housing and rotatable by the drive shaft, the second gear having a plurality of teeth offset from the central axis, wherein the teeth are engageable by the drive shaft;
a pin attached to, and movable with, the first and second gears, the pin being offset from the central axis;
a bracket rotatable around the central axis and connected to an output shaft, the bracket being rotatable separately from the first and second gears, wherein, upon rotation of the bracket, the output shaft rotates, the bracket having at least a first source position and a second source position, wherein the first and second source positions are different; and
a chargeable motivator including a pair of springs, the chargeable motivator having a first end and a second end, the first end being connected to the pin and the second end being connected to a portion of the bracket offset from the central axis, wherein the springs of the chargeable motivator are at least partially stretched upon movement of the pin to urge the movement of the bracket between the first and second source positions.

17. The electrical contactor mechanism of claim 16, further comprising a module connected to the output shaft and including at least one movable electrical contact, wherein the at least one electrical contact moves upon rotation of the output shaft.

18. The electrical contactor mechanism of claim 16, further comprising a first kicker and a second kicker each mounted inside of the housing, wherein the first kicker and the second kicker contact the bracket to urge the bracket between the first and second source positions.

19. The electrical contactor mechanism of claim 16, further comprising a holder mounted outside of the housing and configured to hold the bracket in at least one of the first or second source positions.

20. The electrical contactor mechanism of claim 16, wherein the bracket has an OFF position between the first and second source positions.

21. An automatic transfer switch comprising:
a first motor;
a second motor;
a drive shaft rotatable simultaneously by the first and second motors;
a first gear rotatable by the drive shaft, the first gear having a plurality of teeth offset from a central axis of the first gear, wherein the teeth are engageable by the drive shaft;
a second gear rotatable by the drive shaft, the second gear having a plurality of teeth offset from the central axis, wherein the teeth are engageable by the drive shaft;
a pin attached to, and movable with, the first and second gears, the pin being offset from the central axis;
a bracket rotatable around the central axis and connected to an output shaft, the bracket being rotatable separately from the first and second gears, wherein, upon rotation of the bracket, the output shaft rotates, the bracket having at least a first source position and a second source position, wherein the first and second source positions are different;
a chargeable motivator including a pair of springs, the chargeable motivator having a first end and a second end, the first end being connected to the pin and the second end being connected to a portion of the bracket offset from the central axis, wherein the springs of the chargeable motivator are at least partially stretched upon movement of the pin to urge the movement of the bracket between the first and second source positions; and a module connected to the output shaft and including at least one movable electrical contact, wherein the at least one electrical contact moves upon rotation of the output shaft.

22. The automatic transfer switch of claim 21, further comprising a first kicker and a second kicker, wherein the first kicker and the second kicker contact the bracket to urge the bracket between the first and second source positions.

23. The automatic transfer switch of claim 21, further comprising a holder configured to hold the bracket in at least one of the first or second source positions.

24. The automatic transfer switch of claim 21, wherein the bracket has an OFF position between the first and second source positions.

* * * * *